(12) United States Patent
Vranjes et al.

(10) Patent No.: US 10,048,856 B2
(45) Date of Patent: Aug. 14, 2018

(54) CONFIGURING A USER INTERFACE BASED ON AN EXPERIENCE MODE TRANSITION

(71) Applicant: Microsoft Technology Licensing, LLC, Redmond, WA (US)

(72) Inventors: Miron Vranjes, Seattle, WA (US); Chaitanya Dev Sareen, Seattle, WA (US); Jeremy Bowen, Renton, WA (US); Jesse Clay Satterfield, Seattle, WA (US); Robert J. Jarrett, Snohomish, WA (US); Alex Snitkovskiy, Renton, WA (US); Zachary G. Herman, Seattle, WA (US); Song Zou, Bellevue, WA (US); Mohammed Amirali Samji, Redmond, WA (US); Christopher Doan, Seattle, WA (US); Nils Anders Sundelin, Duvall, WA (US); Michael H. Krause, Redmond, WA (US); Yaou Wei, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/586,684

(22) Filed: Dec. 30, 2014

(65) Prior Publication Data
US 2016/0189328 A1 Jun. 30, 2016

(51) Int. Cl.
*G06F 3/0488* (2013.01)
*G06F 1/16* (2006.01)
*G06F 3/02* (2006.01)

(52) U.S. Cl.
CPC .......... *G06F 3/0488* (2013.01); *G06F 1/1626* (2013.01); *G06F 1/1632* (2013.01);
(Continued)

(58) Field of Classification Search
CPC .... G06F 1/1632; G06F 1/1677; G06F 1/1654; G06F 1/1694; G06F 2200/1634; G06F 3/0481; G06F 3/0488; G06F 9/4411
See application file for complete search history.

(56) References Cited

U.S. PATENT DOCUMENTS 7,802,202 B2   9/2010   Fox et al.
8,577,957 B2   11/2013  Behar et al.
(Continued)

OTHER PUBLICATIONS

"Ultrabook Convertible Application Design Considerations—", Retrieved from <https://software.intel.com/sites/default/files/ultraBook-convertibles.pdf>, Dec. 12, 2012, 6 pages.
(Continued)

*Primary Examiner* — Viet Pham

(57) ABSTRACT

Techniques for configuring a user interface based on an experience mode transition are described. Generally, an experience mode refers to a visual and functional arrangement that is presented to a user of a device. Different experience modes present different visual and functional arrangements to a user. According to various embodiments, a computing device is configured to operate in multiple experience modes and may transition between different experience modes and based on a variety of different triggering events. Generally, a transition between different experience modes causes a visual and/or functional reconfiguration of a user experience on a device.

20 Claims, 20 Drawing Sheets

(52) U.S. Cl.
CPC .......... *G06F 1/1669* (2013.01); *G06F 3/0202* (2013.01); *G06F 3/04886* (2013.01); *G06F 2203/04803* (2013.01)

(56) References Cited

U.S. PATENT DOCUMENTS

| | | | |
|---|---|---|---|
| 8,803,816 B2 | 8/2014 | Kilpatrick, II et al. | |
| 9,471,201 B1* | 10/2016 | Truong ................. | G06F 3/0482 |
| 2010/0007613 A1* | 1/2010 | Costa .................... | G06F 1/1601 345/173 |
| 2012/0084480 A1 | 4/2012 | Reeves et al. | |
| 2013/0191779 A1* | 7/2013 | Radakovitz ........... | G06F 3/0488 715/800 |
| 2014/0247548 A1 | 9/2014 | Sharma et al. | |

OTHER PUBLICATIONS

Duncan, "Krita* Gemini*—Twice as Nice on a 2 in 1", Retrieved from <https://software.intel.com/sites/default/files/managed/53/4c/Krita_Gemini-Twice-As-Nice%20Article.pdf>, Feb. 3, 2014, 8 pages.

Edmondson, "Microsoft Teleports Straight to Windows 10: Here's 5 Things to Know", Retrieved from <http://siliconangle.com/blog/2014/09/30/microsoft-teleports-straight-to-windows-10-heres-5-things-to-know/?> on Oct. 27, 2014, Sep. 30, 2014, 3 pages.

Kim, "Detecting Slate/Clamshell Mode & Screen Orientation in Convertible PC", Retrieved from <https://software.intel.com/sites/default/files/detecting-slate-clamshell-mode-and-screen-orientation-in-convertible-pc-1.pdf>, Sep. 25, 2013, 8 pages.

Min, "Ultrabook™ and Windows 8: A Multi-Touch Experience", Retrieved from <http://www.bhphotovideo.com/explora/computers/tips-solutions/ultrabook-and-windows-8-multi-touch-experience> on Oct. 27, 2014, Jul. 29, 2014, 11 pages.

Rao, et al., "Application Design, Development and User Experience Methodologies for the 2 in 1 Ultrabook™: Creating Compelling Tablet and Laptop Usages on Windows* 8", Retrieved from <https://intel.activeevents.com/sf14/connect/fileDownload/session/4617511313E404EE4C4B45AF6F1DFEC2/SF14_MOBS005_101f.pdf>, Sep. 10, 2014, 143 pages.

Strothers, "Design for Mobile, Tablet, or Touch?", Retrieved from <http://www.userinsight.com/design-for-mobile-tablet-or-touch/> on Oct. 27, 2014, Dec. 3, 2013, 6 pages.

Tayeb, et al.,"How to write a 2 in 1aware application—Dynamically adapting your UI to 2 in 1 configuration changes", Retrieved from <https://software.intel.com/sites/default/files/article/487298/how-to-write-a-2-in-1-aware-application-final.pdf>, Oct. 31, 2013, 13 pages.

Tomlin, "The New UX Design Paradigm", Retrieved from <http://www.usefulusability.com/the-new-ux-design-paradigm/> on Oct. 27, 2014, Dec. 23, 2010, 7 pages.

* cited by examiner

1700

| | Desktop Experience Mode Window State | Touch Experience Mode Window State |
|---|---|---|
| 1706 | Window is non-snapped (e.g., maximized or restored window) and has focus | Window is maximized |
| 1708 | Half-snapped window has focus | Window is half snapped with adjacent half snapped window (if there is one). If there is none, the window is maximized.<br><br>If there are two half snapped windows that do not share a joint divider, they are joined together again. |
| 1710 | Quadrant snapped window has focus. | Window is maximized |
| | | ⋮ |

CONFIGURING A USER INTERFACE BASED ON AN EXPERIENCE MODE TRANSITION

BACKGROUND

Computing devices are conventionally configured in a variety of specific ways to support different user interactions with the computing device tailored for particular settings. The computing device, for instance, may be configured to support mobile usage and therefore is optimized for that usage, such as by including a battery, portable size, and user interface configured for interaction by one or more hands of a user. Likewise, the computing device may be configured for non-mobile applications, such as a traditional desktop PC that has a relatively large size and includes devices that are configured to aid user interaction in a desktop setting, such as keyboards and cursor-control devices.

Computing devices are now available that support use in a variety of settings and consequently may support interaction in a variety of usage scenarios. Examples of such computing devices may include tablets and other configurations that include significant computational resources that enable these devices suitable to perform a variety of different interactions. However, conventional techniques typically limited a user to user interactions that were tailored for a single setting and corresponding usage scenario, and thus could limit interaction with the device when used in other settings.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for configuring a user interface based on an experience mode transition are described. Generally, an experience mode refers to a visual and functional arrangement that is presented to a user of a device. Different experience modes present different visual and functional arrangements to a user. According to various embodiments, a computing device is configured to operate in multiple experience modes and may transition between different experience modes based on a variety of different triggering events. Generally, a transition between different experience modes causes a visual and/or functional reconfiguration of a user experience on a device.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

FIG. 17 illustrates example window state mappings in accordance with one or more embodiments.

DETAILED DESCRIPTION

Overview

Figure 1:
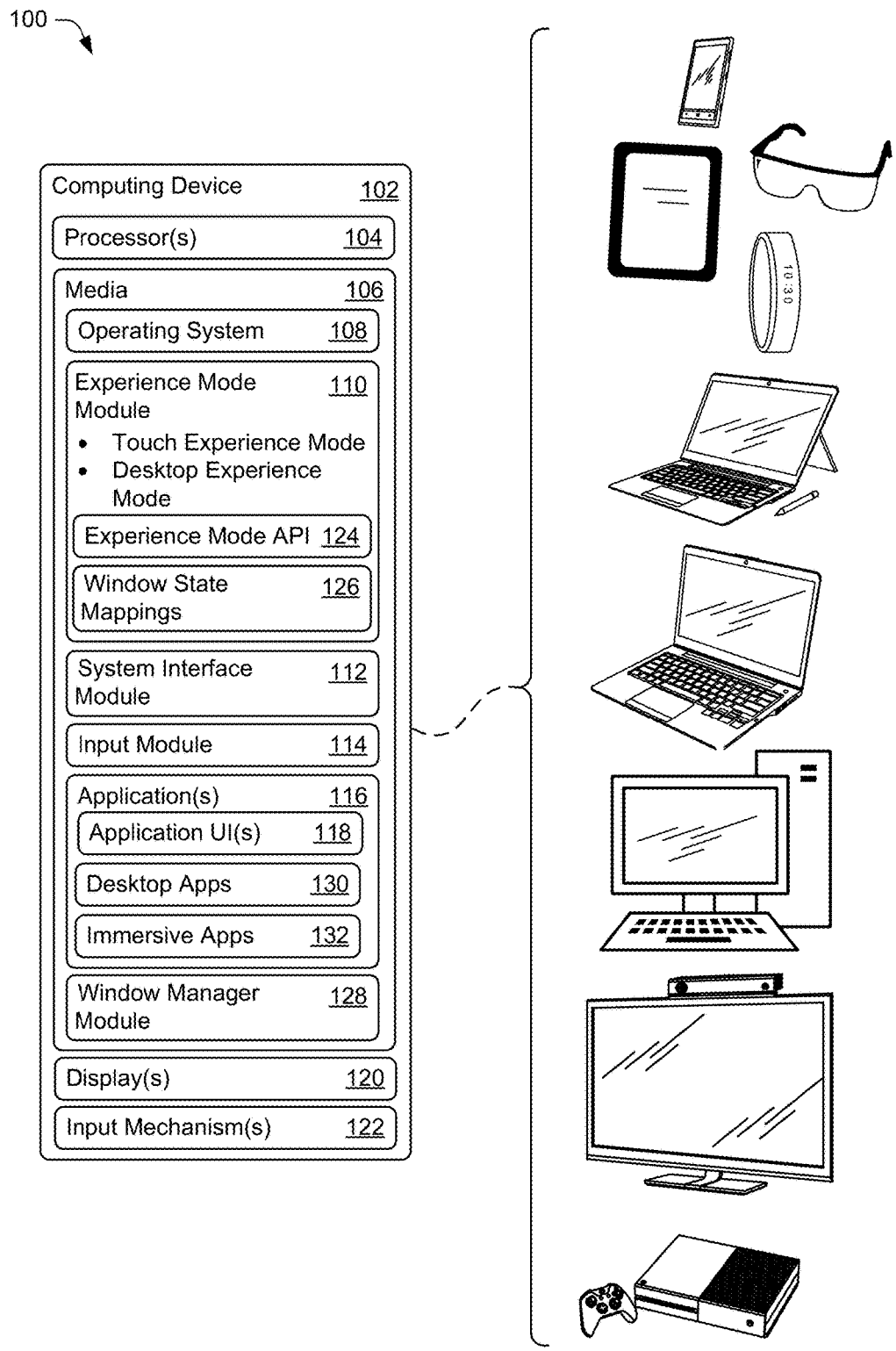
FIG. 1 is an illustration of an environment in an example implementation that is operable to employ techniques discussed herein in accordance with one or more embodiments.

Techniques for configuring a user interface based on an experience mode transition are described. Generally, an experience mode refers to a visual and functional arrangement that is presented to a user of a device. Different experience modes present different visual and functional arrangements to a user, such as different operating system arrangements, different application user interface arrangements, and so forth. Further, different experience modes may be optimized for different interaction scenarios. For instance, a desktop experience mode may be configured for interaction via traditional input instrumentalities, such as a hardware keyboard, a mouse, a trackpad, and so forth. Further, a touch experience mode may be optimized for touch-based interactions, such as using a finger, a stylus, a pen, and so forth.

According to various implementations, a computing device is configured to operate in multiple experience modes, such as a desktop experience mode and a touch experience mode. An example of such a device is a "2-in-1" device that is configured to operate in both a desktop mode (e.g., using a trackpad, a mouse, hardware keyboard, and so forth) and a touch mode for receiving touch-based input to a touchscreen of the device. Another example of such as device is a tablet device that may be docked to one or more external input devices, such as a keyboard, a trackpad, a mouse, and so forth. Further, a device may transition between different experience modes and based on a variety of different triggering events. For instance, a device with a detachable keyboard may transition from a desktop experience mode to a touch experience mode in response to detachment of the keyboard. As another example, a device with a rotatable keyboard may transition from a desktop experience mode to a touch experience mode in response to rotation of the keyboard against a rear surface of the device, such as to assume a tablet-like configuration. Transitions from a touch experience mode to a desktop experience mode may also occur in response to various triggering events.

Generally, enabling transitions between experience modes based on various triggering events reduces a number of user interactions required to switch experience modes. For instance, techniques discussed herein detect a triggering event and cause a switch between experience modes without requiring a user to provide a separate action to cause the transition.

According to various implementations, a transition between different experience modes causes a visual and functional reconfiguration of a user experience on a device. For instance, various visual indicators and affordances may be removed or added dependent on a particular experience mode. Further, different windowing behaviors (e.g., for application user interfaces) may apply dependent on an active experience mode. Examples of different configuration changes and behaviors based on different experience modes are detailed below.

Implementations further enable content and user interaction contexts to be maintained across a switch between experience modes. For instance, an application context that is present in one experience mode is preserved with the application is switched to a different experience mode. Preserving content and user interaction context reduces user interaction time and user inconvenience since a user need not manually rediscover and/or restore a context when a switch between experience modes occurs. Further, a number of required user interactions with a computing device is reduced since a user may continue interacting with an application across a switch between experience modes, thus increasing computational efficiency and decreasing an amount of time it takes to complete various tasks. Further, computing resources are conserved by reducing a number of inputs that must be processed to perform tasks such as switching between different experience modes.

In the following discussion, an example environment is first described that is operable to employ techniques described herein. Next, a section entitled "Example Procedures and Implementation Scenarios" describes some example procedures and scenarios for configuring a user interface based on an experience mode transition in accordance with one or more embodiments. Finally, a section entitled "Example System and Device" describes an example system and device that are operable to employ techniques discussed herein in accordance with one or more embodiments.

Example Environment

FIG. 1 illustrates an example environment 100 in which techniques enabling configuring a user interface based on an experience mode transition can be embodied. Environment 100 includes a computing device 102, which may be implemented in various ways. The computing device 102, for instance, may be configured as a traditional computer (e.g., a desktop personal computer, laptop computer, and so on), a mobile station, an entertainment appliance, a wireless phone, a tablet, a netbook, a wearable device, and so forth as further described in relation to FIG. 21.

Thus, the computing device 102 may range from full resource devices with substantial memory and processor resources (e.g., personal computers, game consoles) to a low-resource device with limited memory and/or processing resources, such as traditional set-top boxes, hand-held game consoles, wearable devices, smart appliances (e.g., "Internet of Things" (IoT) devices), and so forth. The computing device 102 may also relate to software that causes the computing device 102 to perform one or more operations.

Computing device 102 includes computer processor(s) 104 and computer-readable storage media 106 (media 106). Media 106 includes an operating system 108, an experience mode module 110, a system interface module 112, an input module 114, and application(s) 116, each having one or more application user interfaces 118 (application UI(s) 118).

Computing device 102 also includes or has access to one or more displays 120 and input mechanisms 122. Input mechanisms 122 may include gesture-sensitive sensors and devices, such as touch-based sensors and movement-tracking sensors (e.g., camera-based), as well as mice (freestanding or integral with a keyboard), a stylus, touch pads, accelerometers, and microphones with accompanying voice recognition software, to name a few. Input mechanisms 122 may be separate or integral with displays 120; integral examples include gesture-sensitive displays with integrated touch-sensitive or motion-sensitive sensors.

The operating system 108 manages resources of computing device 102 and may be implemented using any suitable instruction format. In some cases, operating system 108 may enable execution of a module or application having a different instruction format through virtualization. Operating system 108 enables other modules of computing device 102 to access the resources of computing device 102, such as the experience mode module 110 and applications 116.

The experience mode module 110 represents functionality for enabling the computing device 102 to operate in and switch between different user experience modes, such as a touch experience mode, a desktop experience mode, and so forth. Generally, a "touch experience mode" refers to an operational mode in which various visual, functional, and behavioral characteristics of the computing device 102 are optimized for touch-based interactions. In at least some implementations, touch experience mode presents a multi-application environment as an immersive environment that excludes usage of desktop-like displays and affordances, such as a status bar (e.g. a taskbar), title bars, and so forth. A "desktop experience mode" generally refers to a more traditional operational mode, such as involving user interaction via a mouse, trackpad, hardware keyboard, and so forth. As further detailed below, touch experience mode and desktop experience mode may include different respective visual, functional, and behavioral characteristics that can be applied depending on which mode is active on the computing device 102.

The experience mode module 110 includes an experience mode application programming interface (API) 124 and window state mappings 126. Generally, the experience mode API 124 represents an API that provides an interface to interact with the experience mode module 110. For instance, functionalities such as the operating system 108 and the applications 116 can call the experience mode API 124 to cause transitions between different experience modes. Further, the experience mode module 110 may utilize the experience mode API 124 to communicate various experience-related events to other functionalities, such as to the operating system 108, the applications 116, a window manager module 128, and so forth.

The window state mappings 126 represent mappings between window states for different experience modes. For instance, the window state mappings 126 specify how a particular window state in the desktop experience mode is to be represented when a transition to the touch experience mode occurs, and vice-versa. An example implementation of the window state mappings 126 is detailed below with reference to FIG. 17.

System-interface module 112 provides one or more interfaces through which interaction with operating system 108 is enabled, such as an application-launching interface, an application management user interface (application management UI), a start menu, a control panel, system tools, options menus, to name just a few. Input module 114 receives input through the application windows, input mechanisms 122, or other controls and affordances of a particular active environment.

Applications 116 include any suitable type of application, such as productivity applications, web browsers, media viewers, navigation applications, multimedia editing applications, and so forth. Operating system 108 and/or experience mode module 110 generally support applications of varying types or instruction sets natively and/or via virtualization. For example, the experience mode module 110 may simultaneously and/or concurrently present multiple applications 116 of varying types or instruction sets.

Individual applications 116 include one or more application UIs 118, which enables viewing or interaction with content of the application. The application UIs 118 may include predefined properties or preferences (e.g., default values or settings) for presenting an application 116, such as an aspect ratio, maximum size, minimum size, position, primacy, display orientation, and so forth. In at least some implementations, application programming interfaces (APIs) associated with an application 116 enable access to the properties or preferences of the application 116 or respective application UI 118.

The applications 116 includes desktop applications 130 and immersive applications 132. Generally, the desktop applications 130 represent traditional applications that are configured (e.g., coded) for operation in a desktop mode. For instance, the desktop applications 130 may be configured primarily for interaction via traditional input methods, such as a hardware keyboard, mouse, trackpad, and so forth. The immersive applications 132 represent applications that are optimized for operation in a touch mode. For example, UI aspects of the immersive applications 132 may be configured for touch user interactions. Further, various framing and interactivity aspects of the application UIs 118 for the immersive applications 132 may be optimized and/or simplified for operation in a touch mode.

According to various implementations, techniques for configuring a user interface based on an experience mode transition discussed herein enable individual of the desktop applications 130 and the immersive applications 132 to operate in both a desktop mode and a touch mode. Further, implementations enable switching desktop applications 130 and immersive applications 132 between the desktop mode and the touch mode without interrupting operational continuity and interaction context of the applications.

According to various implementations, window manager module 128 manages window behavior for different windows and/or user interfaces, such as window size, window placement, window layering, and so forth. The window manager module 128, for example, enforces behavior for position and/or size of application windows to provide an optimized layout of application windows in a multi-mode environment.

In some cases, allowed window behaviors enforced by the window manager module 128 may depend on a particular mode that is active. For instance, if the touch experience mode is currently active on the computing device 102, touch experience mode behaviors may be enforced for specifying allowed and disallowed behaviors for windows displayed on the display(s) 120. In cases where the desktop experience mode is active on the computing device 102, desktop experience mode behaviors may be enforced for specifying allowed and disallowed behaviors for windows displayed on the display(s) 120. Examples of such allowed and disallowed behaviors are detailed below.

Example Procedures and Implementation Scenarios

This section describes some example procedures and implementation scenarios for configuring a user interface based on an experience mode transition in accordance with one or more implementations.

The procedures described herein may be used separately or in combination with each other, in whole or in part. These procedures are shown as sets of operations (or acts) performed, such as through one or more entities or modules, and are not necessarily limited to the order shown for performing the operation. The example procedures may be employed in the environment 100 of FIG. 1, the system 2100 of FIG. 21, and/or any other suitable environment. According to one or more implementations, the procedures describe example ways for performing various aspects of the example implementation scenarios described herein. In at least some implementations, steps described for the various procedures are implemented automatically and independent of user interaction.

Figure 2:
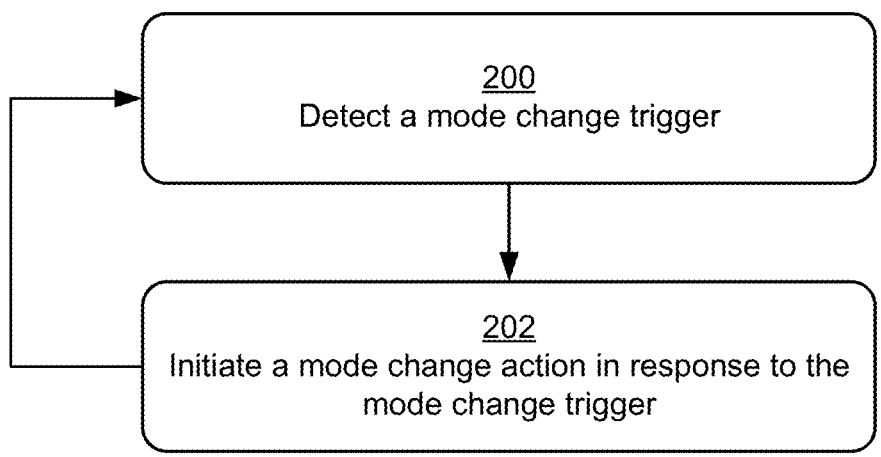
FIG. 2 is a flow diagram that describes steps in a method for causing a mode change action in accordance with one or more embodiments.

FIG. 2 is a flow diagram that describes steps in a method in accordance with one or more embodiments. The method, for instance, describes an example procedure for causing a mode change action in accordance with one or more embodiments.

Step 200 detects a mode change trigger. Generally, the mode change trigger represents an event and/or an action that occurs indicating a change in experience mode. For instance, the mode change trigger represents a change from a desktop experience mode to a touch experience mode, or vice-versa. The mode change trigger is detectable by various functionalities, such as the operating system 108, the experience mode module 110, and so forth.

In at least some implementations, the mode change trigger can be detected in response to a notification of a mode change. For instance, an application 116, the window manager module 128, and so forth, may receive a notification from the operating system 108 and/or the experience mode module 110 of the mode change.

A mode change trigger may be generated in various ways. For instance, a mode change trigger may occur in response to a hardware-based action. As an example, consider that a user connects a hardware input device such as a keyboard and/or a mouse to a portable computer, e.g., a tablet. Such connection may occur in various ways, such as via a physical connection, a wireless connection, and so forth. Connecting the hardware input device to the portable computer may generate a mode change trigger to change from a touch mode to a desktop mode.

In a further example, a mode change trigger may occur based on a trigger from hardware itself. For instance, a hardware device such as an input device (e.g., a keyboard, a trackpad, a mouse, and so forth) can generate a signal for a mode change trigger. The signal, for example, may be communicated via a hardware-to-software interface that communicates the mode change trigger from the hardware device to a mode change functionality, such as the experience mode module 110. Examples of such hardware-initiated mode changes include pressing a mode change button on a hardware device, a docking and/or undocking procedure of a hardware device, an attachment and/or detachment of a hardware device, and so forth.

As another example, consider that a user disconnects a hardware input device from a portable computing device. The user, for instance, may disconnect a physical connection between the hardware input device and the portable computing device. As another example, the user may disable a wireless connection (e.g., a Bluetooth connection) between the hardware input device and the portable computing device. Disconnecting the hardware input device from the portable computer may generate a mode change trigger to change from a desktop mode to a touch mode.

As yet a further example, a mode change trigger may occur in response to user input instructing a change between modes. For instance, a selectable mode control may be displayed that is selectable to cause a change between experience modes. The selectable mode control may be displayed and/or accessible at various locations, such as part of a task bar, a start menu, an options menu, and so forth. Examples of a selectable mode control are discussed in more detail below.

In a further example, a mode change trigger may be activated by an application and/or other functionality in response to a particular action. For instance, an application 116 may be configured specifically for a particular mode, e.g., the touch experience mode or the desktop experience mode. Thus, launching the application while a computing device is in a different mode may cause the computing device to switch from the different mode to the particular mode.

Thus, a mode change trigger may be hardware-initiated, user initiated, software initiated, and so forth. A variety of other mode change triggers not expressly discussed herein are contemplated within the spirit and scope of the disclosed implementations.

Step 202 initiates a mode change action in response to the mode change trigger. Various mode change actions may be performed in accordance with one or more implementations. For instance, the operating system 108 may reconfigure various visualizations based on the mode change, such as a user interface, a menu, a task bar, and so forth. Further, the experience mode module 110 notifies various functionalities of the mode change. For instance, the experience mode module 110 notifies applications 116 that are currently active on the computing device 102 of the mode change. The experience mode module 110 further notifies the window manager module 128 of the mode change. Thus, in at least some implementations, the experience mode module 110 represents functionality for notifying various other functionalities of the change in experience mode.

Accordingly, an active application 116 and/or the window manager module 128 may perform an action in response to the notification of the mode change, such as reconfiguring an application UI 118, enabling a particular application functionality, disabling a particular application functionality, and so forth. Examples of such actions are detailed below.

Further illustrated in FIG. 2 is that the method enables multiple transitions between different experience modes. For instance, a particular mode change trigger may cause a transition from the desktop experience mode to the touch experience mode, and a further mode change trigger may cause a transition from the touch experience mode back to the desktop experience mode.

Figure 3:
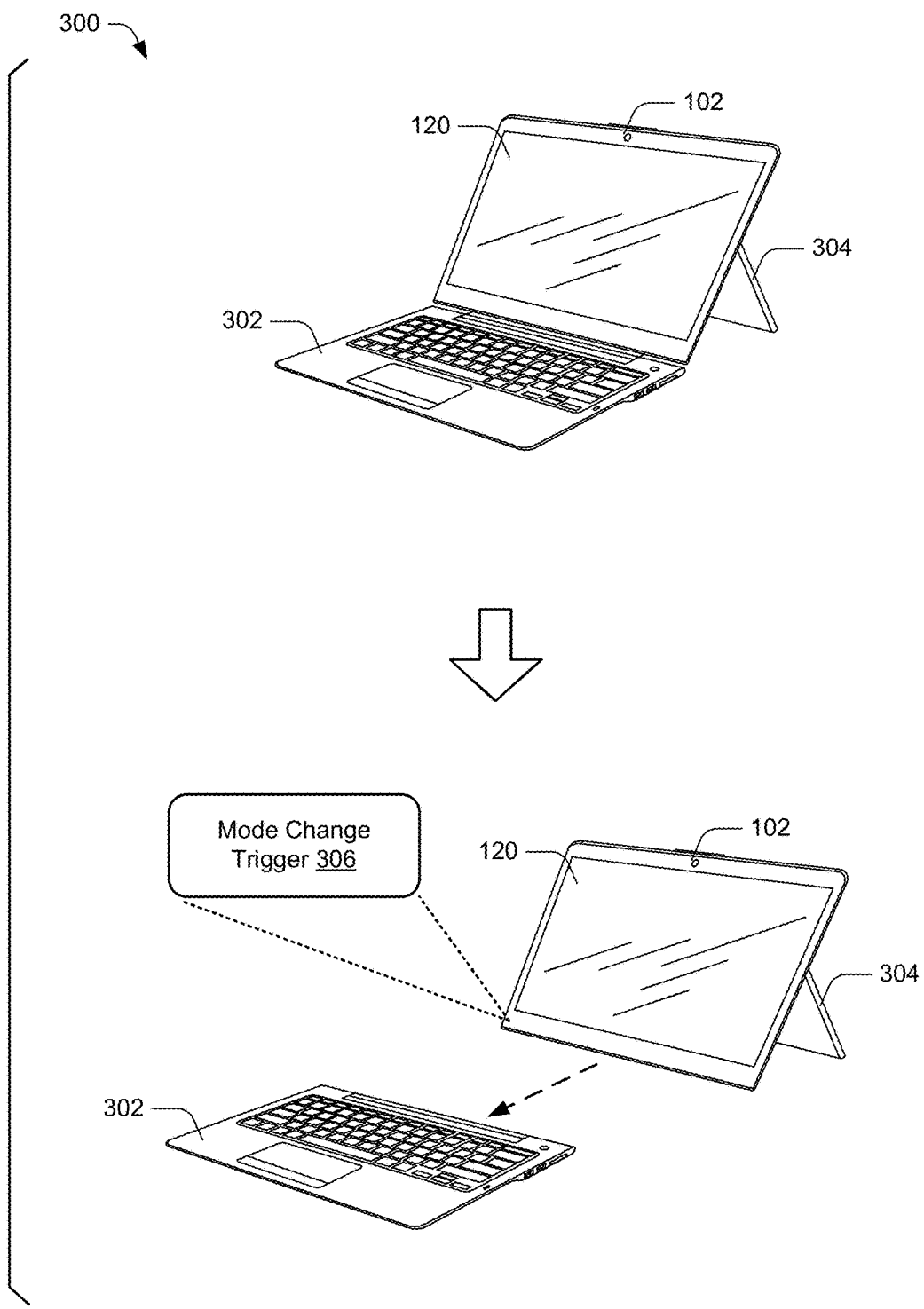
FIG. 3 depicts an example implementation scenario for an experience mode change in accordance with one or more embodiments.

FIG. 3 illustrates an example implementation scenario 300 for an experience mode change in accordance with one or more embodiments. The upper portion of the scenario 300 includes an implementation of the computing device 102 with the display 120 and an input device 302. In this particular example, the input device 302 includes a keyboard portion and a trackpad portion. This is not intended to be limiting, however, and the input device 302 may be implemented in various other ways, such as a game controller, a music controller, and so forth. Thus, the input device 302 generally represents an instrumentality for providing various types of input to the computing device 102.

According to various implementations, the input device 302 is detachably connected to the computing device 102. For instance, the input device 302 is attachable to the computing device 102 via any suitable attachment technique, such as via magnets, an attachment clip, an attachment plug, and so forth. Thus, the input device 302 is attachable to and detachable from the computing device 102 to support a variety of different usage scenarios.

In the scenario 300, the computing device 302 is physically supported in a position relative to an adjacent surface via a support component 304. According to various implementations, the support component 304 is permanently and rotatably attached to the computing device 102 and may assume different positions relative to the computing device 102 to support a variety of different usage scenarios. Alternatively, the support component 304 may be implemented as a detachable support component.

In at least some implementations, the arrangement of the computing device 102 illustrated in the upper portion of the scenario 300 represents the computing device 102 in a desktop experience mode.

Proceeding to the lower portion of the scenario 300, the input device 302 is detached from the computing device 102. For instance, a user grips and physically detaches the input device 302 from the computing device 102. In response to detachment of the input device 302, a mode change trigger 306 is generated. The experience mode module 110, for instance, detects the detachment of the input device 302. Accordingly, the experience mode module 110 performs various actions in response to detecting the mode change trigger 306. For example, the experience mode module 110 notifies various functionalities of a mode change. Examples of such functionalities include the operating system 108, the applications 116, the window manager module 128, and so forth.

According to various implementations, the mode change trigger 306 represents a change from a desktop experience mode (e.g., as represented in the upper portion of the scenario 300) to a touch experience mode. For instance, detachment of the input device 302 may indicate an intent of a user to interact with the computing device 102 via interaction with the display 120. A user, for example, detaches the input device 302 to enable the computing device 102 to be used in a tablet usage scenario.

According to various implementations, the input device 302 may be reattached to the computing device 102 to cause a further mode change trigger. For instance, reattaching the input device 302 such as represented in the upper portion of the scenario 300 causes a further mode change trigger to be generated. The further mode change trigger, for example, represents a change from a tablet experience mode to a desktop experience mode. Thus, connecting and disconnecting the input device 302 causes different mode change triggers to be generated.

While the scenario 300 is discussed with reference to a change in physical connectivity between the input device 302 and the computing device 102, a similar scenario applies for non-physical connectivity. For instance, the input device 302 may be wirelessly connected to the computing device using a suitable wireless technology, such as Bluetooth, WiFi Direct, near-field communication (NFC), and so forth. Wireless connectivity between the input device 302 and the computing device 102 may cause the computing device 102 to operate in a desktop experience mode. According to various implementations, disabling and/or disconnecting a wireless connection between the input device 302 and the computing device 102 causes a mode change trigger (e.g., the mode change trigger 306) to be generated. In such a scenario, various implementation and operational details discussed above with reference to the mode change trigger 306 apply.

Figure 4:
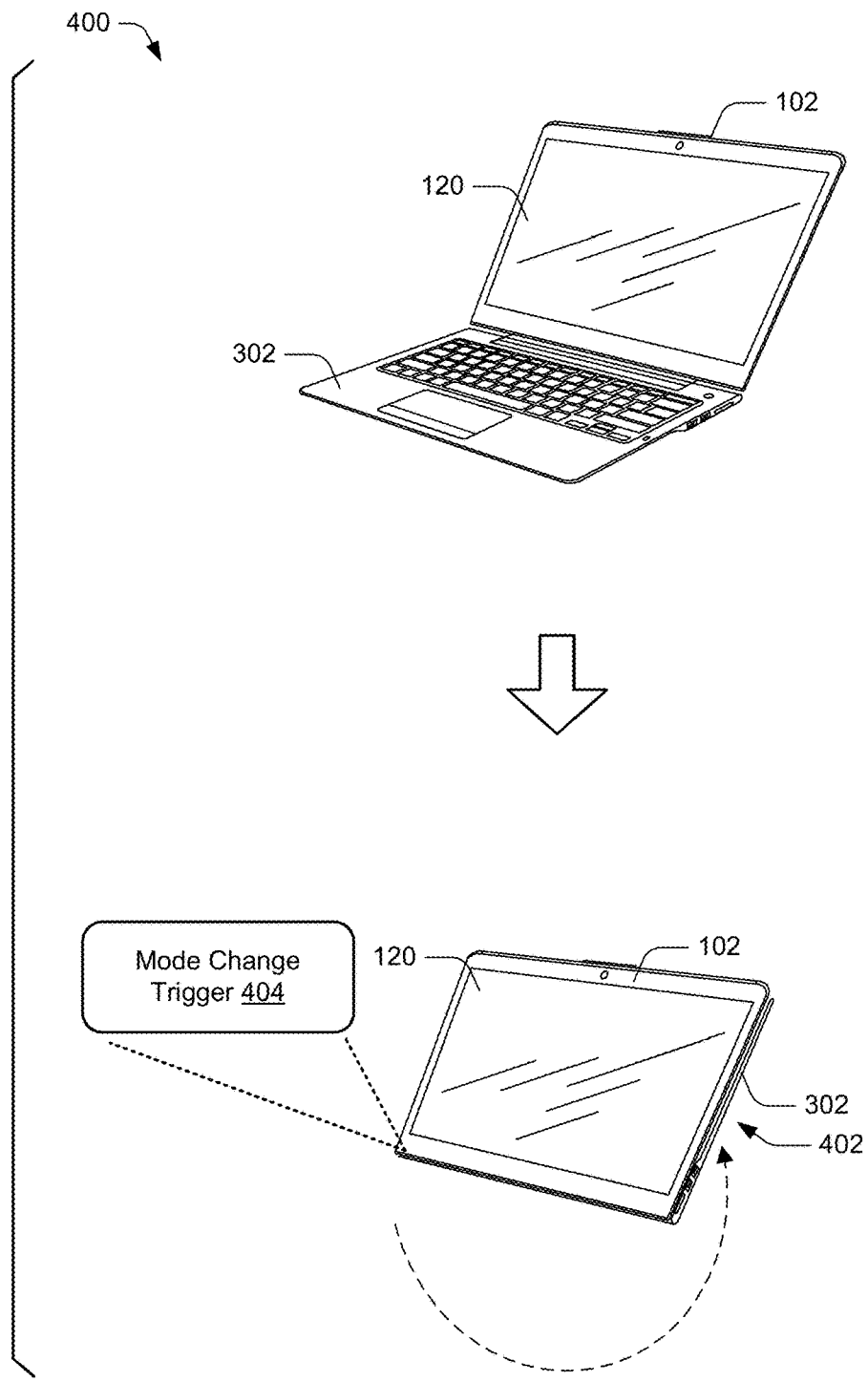
FIG. 4 depicts an example implementation scenario for an experience mode change in accordance with one or more embodiments.

FIG. 4 illustrates an example implementation scenario 400 for an experience mode change in accordance with one or more embodiments. The upper portion of the scenario 400 includes an implementation of the computing device 102 with the display 120 and the input device 302.

Proceeding to the lower portion of the scenario 400, the input device 302 is rotated against a rear surface 402 of the computing device 102. For example, a user repositions the input device 302 against the rear surface 402. The input device 302, for instance, is rotatably attached to the computing device 102 such that the input device 302 can be positioned at various angles respective to the display 120. Such repositioning of the input device 302 enables the computing device 102 to support a variety of different usage scenarios.

In response to rotation of the input device 302 against the rear surface 402, a mode change trigger 404 is generated. The experience mode module 110, for instance, detects the rotation of the input device 302. Accordingly, the experience mode module 110 performs various actions in response to detecting the mode change trigger 404. For example, the experience mode module 110 notifies various functionalities of a mode change. Examples of such functionalities include the operating system 108, the applications 116, the window manager module 128, and so forth.

In at least some implementations, the mode change trigger 404 represents a change from a desktop experience mode (e.g., as represented in the upper portion of the scenario 400) to a touch experience mode. For instance, positioning of the input device 302 against the rear surface 402 may indicate an intent of a user to interact with the computing device 102 via interaction with the display 120. A user, for example, positions the input device 302 against the rear surface 402 to enable the computing device 102 to be used in a tablet usage scenario.

According to various implementations, the input device 302 may be repositioned from the rear surface 402 to a different position to cause a further mode change trigger. For instance, repositioning the input device 302 away from the rear surface 402 to the position represented in the upper portion of the scenario 400 causes a further mode change trigger to be generated. The further mode change trigger, for example, represents a change from a tablet experience mode to a desktop experience mode. Thus, repositioning the input device 302 to different positions relative to the computing device 102 causes different mode change triggers to be generated.

Figure 5:
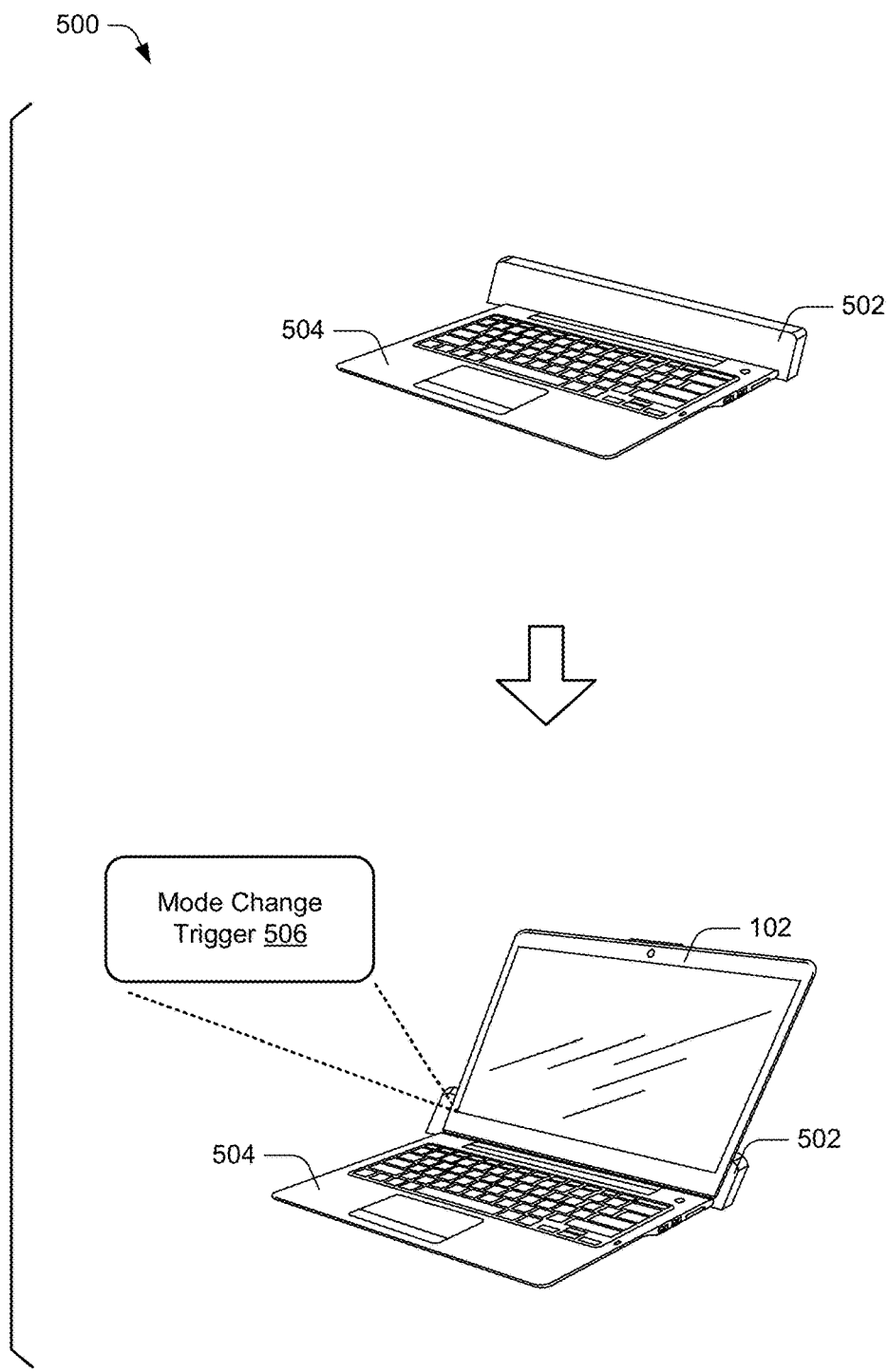
FIG. 5 depicts an example implementation scenario for an experience mode change in accordance with one or more embodiments.

FIG. 5 illustrates an example implementation scenario 500 for an experience mode change in accordance with one or more embodiments. The upper portion of the scenario 500 includes a docking station 502. Generally, the docking station 502 represents an apparatus that provides physical support as well as various types of connectivity for a portable computing device. The docking station 502 includes an input device 504.

Proceeding to the lower portion of the scenario 500, the computing device 102 is connected to the docking station 502. For instance, the docketing station 502 includes various connectivity features to which the computing device 102 is connected. In at least some implementations, the connectivity features support physical connectivity of the computing device 102 to the docking station 502, such as via hardware connectors, plugs, ports, and so forth. Alternatively or additionally, such connectivity features may enable wireless connectivity of the computing device 102 to the docking station 502.

Generally, connection of the computing device 102 to the docking station 502 enables the docking station 502 to provide various functionality to the computing device 102. Examples of such functionality include power connectivity (e.g., to an alternating current (AC) power source), network connectivity, peripheral device connectivity, and so forth. The docking station 502, for instance, serves as a portal for the computing device 102 to such functionality. In this particular example, connection of the computing device 102 to the docking station 502 enables connectivity of the input device 504 to the computing device 102. Thus, the input device 504 may be utilized to provide input to the computing device 102.

Further to the scenario 500, connection of the computing device 102 to the docking station 502 causes the computing device 102 to generate a mode change trigger 506. In at least some implementations, the mode change trigger 506 represents a change from a touch experience mode to a desktop experience mode. For instance, connecting the computing device 102 to the docking station 502 indicates an intent of a user to interact with the computing device 102 according to a desktop usage scenario.

According to various implementations, disconnecting the computing device 102 from the docking station 502 causes a further mode change trigger to be generated. For instance, removing the computing device 102 from the docking station 502 causes a further mode change trigger to be generated. The further mode change trigger, for example, represents a change from a desktop experience mode to a tablet experience mode. Thus, connecting and disconnecting the computing device 102 from the docking station 502 causes different respective mode change triggers to be generated.

Generally, the example implementation scenarios discussed above illustrate that different hardware-based events cause transitions between different user experience modes to support different usage scenarios, such as for desktop mode usage (e.g., as a laptop), touch mode usage (e.g., as a tablet), and so forth. These scenarios are presented for purpose of example only, and it is to be appreciated that a variety of other triggering actions, hardware and otherwise, may be employed in accordance with the disclosed implementations.

Figure 6:
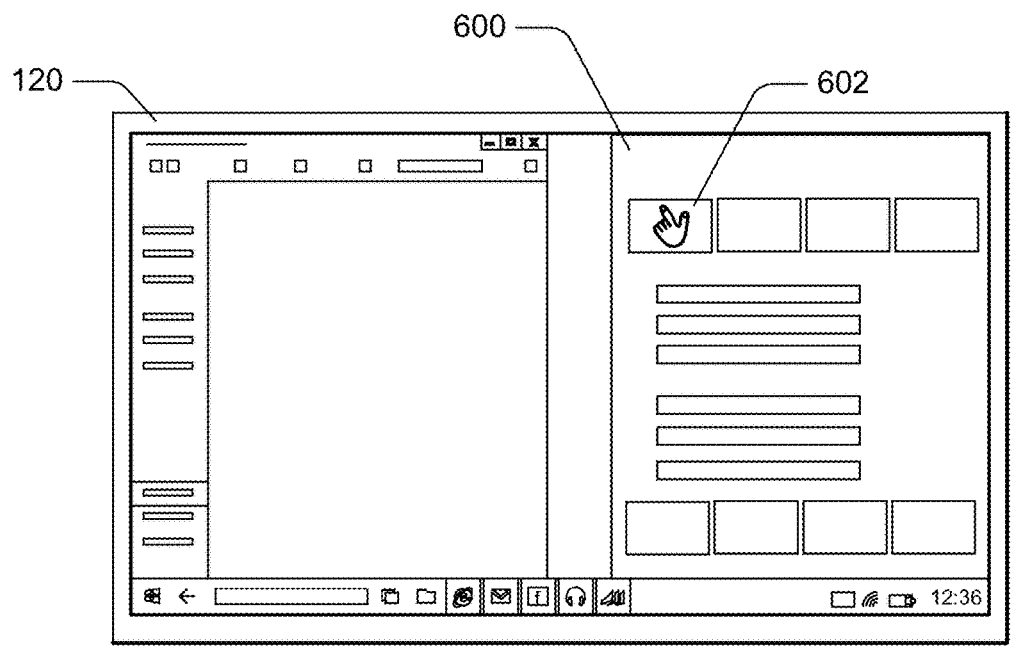
FIG. 6 illustrates an example experience mode control for change an experience mode in accordance with one or more embodiments.

FIG. 6 illustrates an example implementation of the display 120 with various windows and other visual indicia displayed thereon. For instance, an action center 600 is displayed. Generally, the action center 600 represents a user interface that presents a variety of visual indicia that are selectable to cause various actions to be performed and various settings to be changed. Examples of such actions include power-related actions (e.g., sleep, restart, shutdown, and so forth), enabling/disabling wireless functionality, changing audio volume settings, and so forth.

Displayed in the action center 600 is an experience mode control 602 that is selectable to cause the computing device 102 to switch between different experience modes. For instance, in this particular example the display 120 is configured according to a desktop experience mode. Accordingly, selection of the experience mode control 602 causes the display 120 to switch to a touch experience mode. In a scenario where the display 120 is configured according to a touch experience mode, selecting the experience mode control 602 causes the display 120 to reconfigure according to the desktop experience mode.

Figure 7:
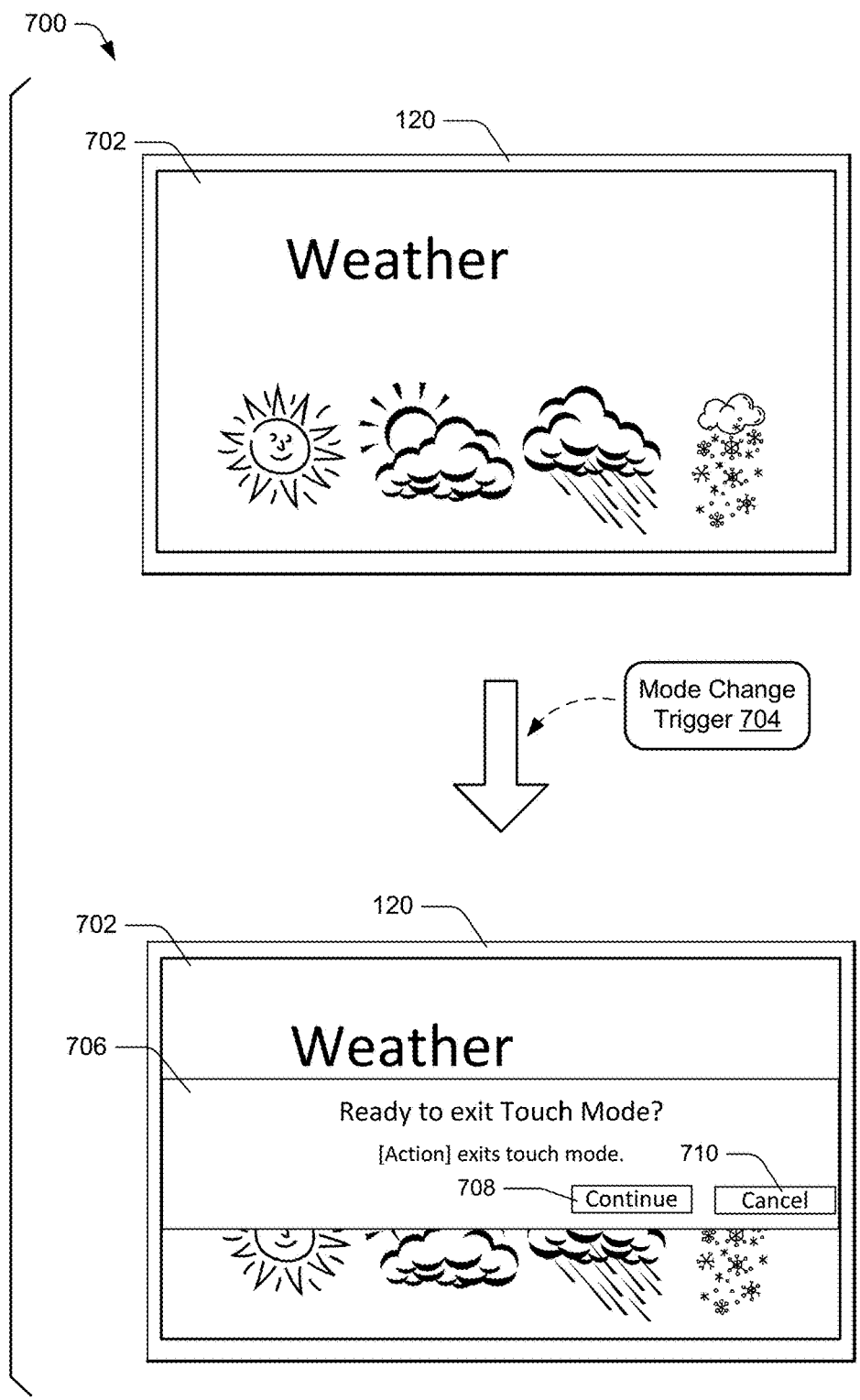
FIG. 7 illustrates an example implementation scenario for confirmation of an experience mode change in accordance with one or more embodiments.

FIG. 7 illustrates an example implementation scenario 700 for confirmation of an experience mode change in accordance with one or more embodiments. The upper portion of the scenario 700 includes the display 120 displaying an application UI 702 for a particular application 116. In this particular implementation, the display 120 is configured in a touch experience mode. Notice that in the touch experience mode, the application UI 702 is simplified in comparison with a desktop experience mode. For instance, the application UI 702 does not include a title bar or window controls such as minimize, close, and restore controls. Further, no task bars or other application status indicia for other applications are displayed. In at least some implementations, an application UI that is launched in a touch experience mode is launched maximized by default such that the application UI fills the entire display area of the display 120.

Proceeding to the lower portion of the scenario 700, a mode change trigger 704 is received. Examples of different types and instances of mode change triggers are presented throughout this disclosure. Generally, the mode change trigger 704 indicates a change from a touch experience mode to a desktop experience mode.

In response to the mode change trigger 704, a confirmation prompt 706 is presented that informs a user that a particular action causes an exit from a touch experience mode. Generally, the term "[Action]" is replaceable with text describing any mode change trigger, such as the different mode change triggers discussed herein. The confirmation prompt 706 further queries the user as to whether the user is ready to exit the touch experience mode. Accordingly, the confirmation prompt 706 includes a continue control 708 and a cancel control 710. The continue control 708 is selectable to continue and thus exit the touch experience mode. For instance, selection of the continue control 708 causes the display 120 to reconfigure from the touch experience mode to the desktop experience mode. Various visual and operational results of transitioning between different experience modes are detailed in subsequent drawings and discussion.

Selection of the cancel control 710 causes the display 120 to remain in the touch experience mode. For instance, selection of the cancel control 710 causes the confirmation prompt 706 to be removed from the display 120 and the display 120 to remain in the visual state illustrated in the upper portion of the scenario 700 such that the display 120 remains configured according to the touch experience mode.

Thus, the scenario 700 illustrates that techniques discussed herein inform users of various actions that cause transitions between different experience modes, and provide users with opportunities to confirm or cancel such transitions. While the scenario 700 is discussed with reference to a visual prompt, it is to be appreciated that various other types of prompts may additionally or alternatively be employed, such as an audible prompt, a tactile prompt (e.g., a vibration or other tactile indicator), and so forth.

Figure 8:
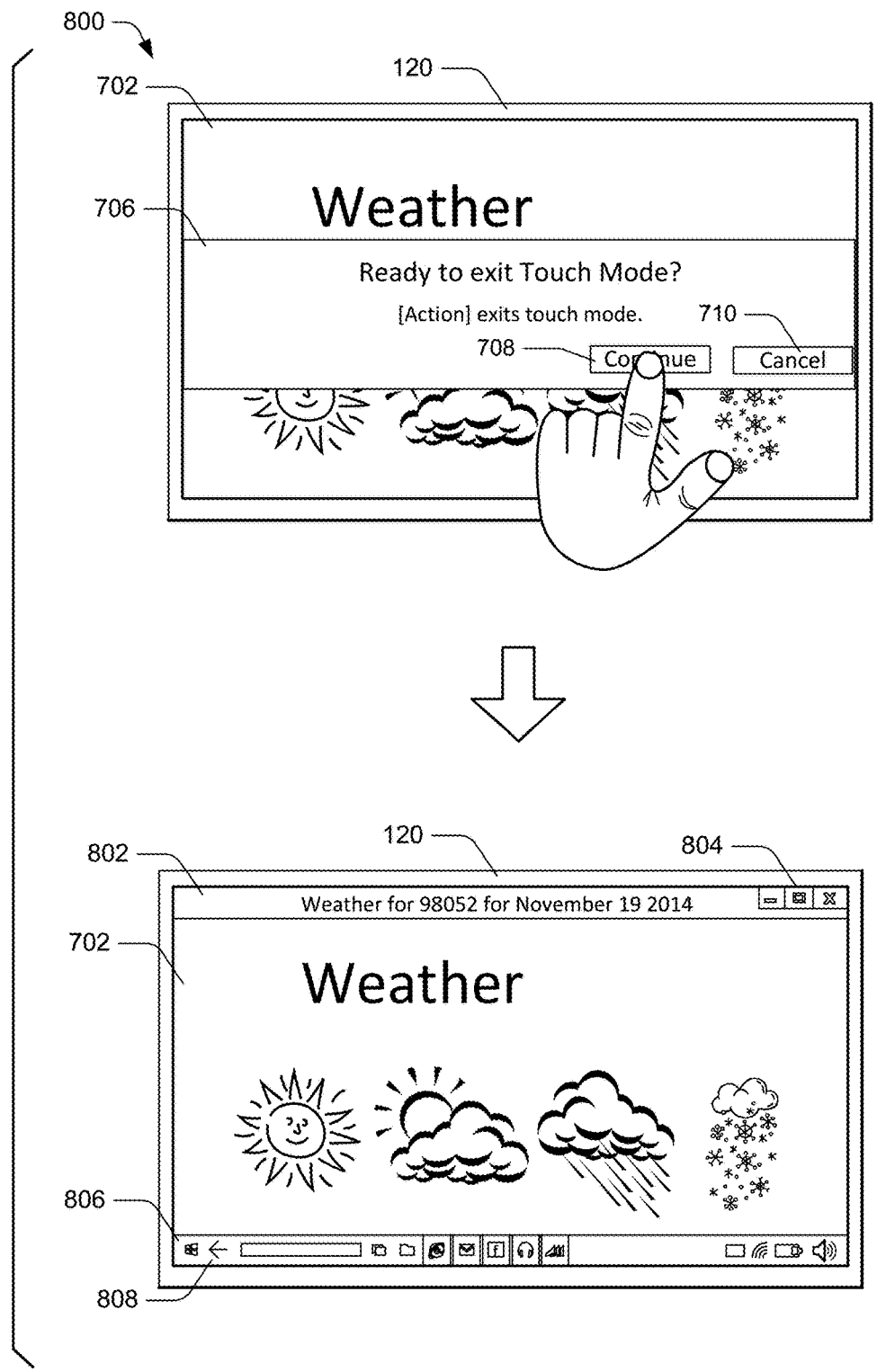
FIG. 8 illustrates an example implementation scenario for an experience mode change in accordance with one or more embodiments.

FIG. 8 illustrates an example implementation scenario 800 for an experience mode change in accordance with one or more implementations. In at least some implementations, the scenario 800 represents a continuation of the scenario 700 discussed above.

In the upper portion of the scenario 800, the display 120 is illustrated with the application UI 702 and the confirmation prompt 706. Continuing to the lower portion of the scenario 800 and in response to user selection of the continue control 708, the confirmation prompt 706 is removed and the display 120 is reconfigured from the touch experience mode to the desktop experience mode. As illustrated, transition from the touch experience mode to the desktop experience mode causes several visual changes to the display 120. For instance, a title bar 802 is drawn in the header of the application UI 702. Generally, the title bar 802 identifies an application represented by the application UI 702, and may include other status information for the application UI 702. The title bar 802 includes window controls 804, which are selectable to cause different window-related actions. For instance, the window controls 804 include a minimize control that is selectable to minimize the application UI 702 in the display 120, a restore control that is selectable to restore a previous size of the application UI 702, and a close control that is selectable to close the application UI 702.

As a further result of transitioning to the desktop experience mode, a status bar 806 is displayed in the display 120. Generally, the status bar 806 includes visual indicia that represent different applications that are active (e.g., running and/or launched) on the computing device 102, and/or visual indicia that are selectable to cause applications to be launched. The status bar 806 further includes system status information for the computing device 102, such as battery charge level, wireless connectivity status, audio volume level, and so forth.

In this particular example, the status bar 806 includes a back button 808 that is representative of a control that is selectable to navigate backward through various functionalities. For instance, consider that the application UI 702 was previously navigated through multiple window iterations such that a navigational stack of multiple window versions for the application UI 702 is accumulated. Accordingly, selection of the back button 808 causes the application UI 702 to navigate backward through the navigational stack. For instance, a single selection of the back button 808 causes a navigation to a previous version of the application UI 702.

Consider an implementation where a user selects the back button 808 until the top of the navigational stack is reached, e.g., where an initial version of the application UI 702 is displayed and there are no previous/older versions of the application UI 702 to be displayed. In such an implementation, a further selection of the back button 808 causes a navigation to a different functionality. For instance, further selection of the back button 808 may cause navigation to an application UI for a different application, such a different active application with which a user was previously interacting. Alternatively or additionally, further selection of the back button 808 may cause a navigation to an application launcher window that enables applications to be launched and/or statuses of different applications to be viewed. Thus, the back button 808 generally represents a functionality for navigating backward through a navigational stack of an application and/or multiple applications, and for transitioning between different applications and/or system functionalities.

While the scenarios 700, 800 are discussed with reference to a transition from a touch experience mode to a desktop experience mode, it is to be appreciated that similar scenarios may be employed for different transitions between experience modes. For instance, the scenarios 700, 800 may be performed in reverse order to transition the display 120 from the desktop experience mode displayed in the lower portion of the scenario 800, to the touch experience mode displayed in the upper portion of the scenario 700. As an example of such a transition, consider the following implementation scenario.

Figure 9:
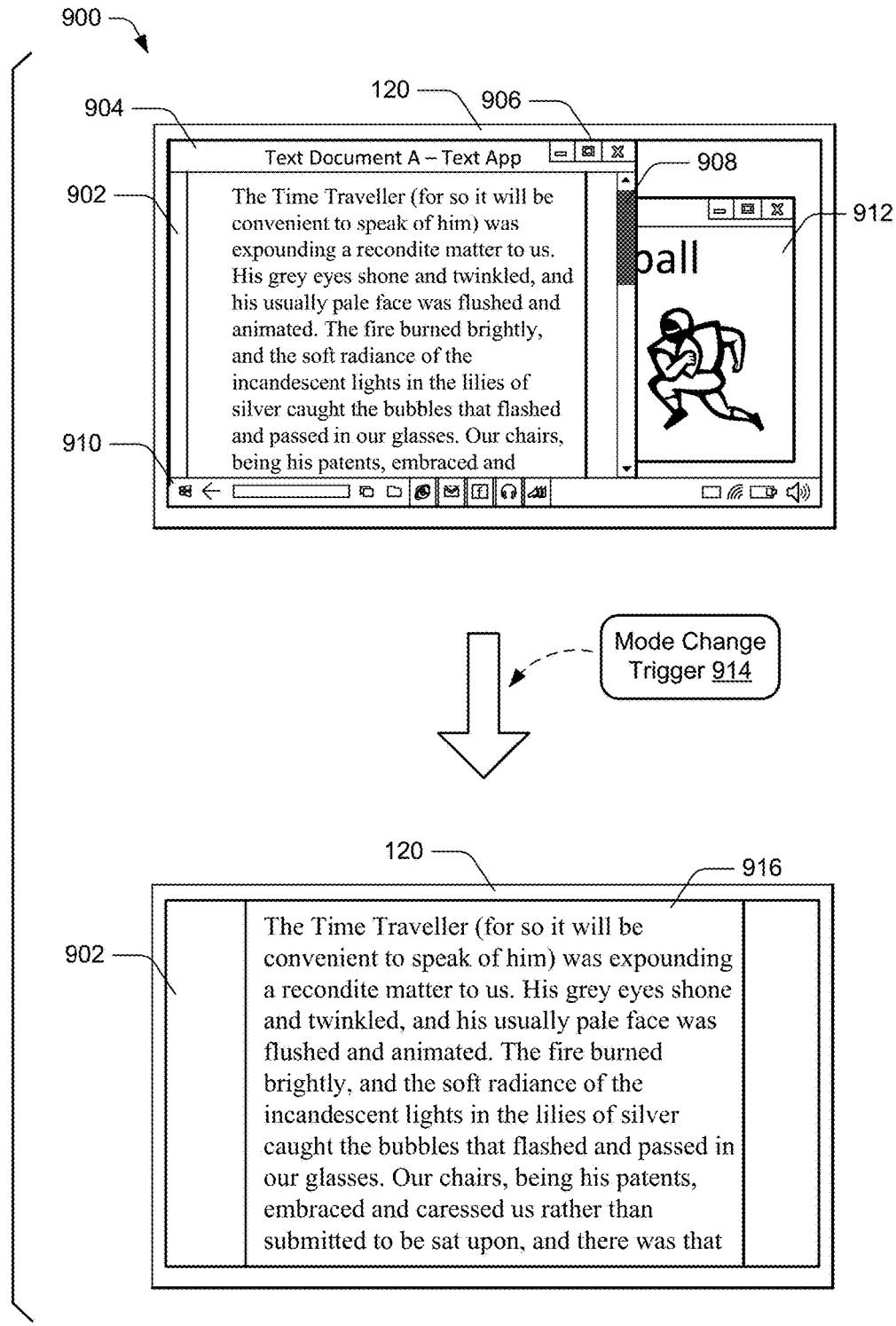
FIG. 9 illustrates an example implementation scenario for an experience mode change in accordance with one or more embodiments.

FIG. 9 illustrates an example implementation scenario 900 for an experience mode change in accordance with one or more implementations. The upper portion of the scenario 900 illustrates an application UI 902 displayed on the display 120 configured in a desktop experience mode. In this particular example, the application UI 902 represents a UI for a text editing application. This example application is presented for purpose of illustration only, and it is to be appreciated that techniques discussed herein can be employed using any type and/or instance of an application.

The application UI 902 includes various visualizations and affordances associated with the desktop experience mode, such as a title bar 904 with window controls 906, and a navigation bar 908. Generally, the title bar 904 identifies an application represented by the application UI 902, and content (e.g., an instance of a text document) displayed in the application UI 902. The navigation bar 908 represents a navigation control for navigating within the application UI 902, such as for scrolling the text document displayed in the application UI 902. A status bar 910 is also displayed in the lower portion of the application UI 902. Example aspects and attributes of the status bar 910 are discussed above with reference to the status bar 806.

Notice that in the scenario 900, the application UI 902 is not maximized, e.g., the application UI 902 does not fill the entire available display area of the display 120. For instance, an application UI 912 (e.g., for a different application) is also displayed. The application UI 902, however, partially overlays and thus partially occludes the application UI 912. According to various implementations, this indicates that the application UI 902 has focus in the display 120, indicating for example that a user is currently interacting with the application UI 902 and not the application UI 912.

Proceeding to the lower portion of the scenario 900, a mode change trigger 914 is received. Various types, instance, and aspects of mode change triggers are detailed elsewhere herein. In this particular scenario, the mode change trigger 914 represents a change from the desktop experience mode to the touch experience mode. Thus, in response to the mode change trigger 914, the display 120 is reconfigured from the desktop experience mode to the touch experience mode.

As part of such reconfiguration, the application UI 902 is maximized in the display 120. For instance, the application UI 902 is resized to fill all of the available display area of the display 120. With reference to the application UI 912 illustrated in the upper portion of the scenario 900, the application UI 902 is resized such that it wholly occludes the application UI 912 and any other application and/or system windows displayed in the display 120. Thus, in at least some implementations, a switch from a desktop experience mode to a touch experience mode causes an application UI that has focus to be automatically maximized in response to the switch.

As further illustrated, in response to the transition to the touch experience mode, various visualizations and affordances are reconfigured and/or removed. For instance, the title bar 904 and the navigation bar 908 are removed from the application UI 902. Further, the status bar 910 is removed. Thus, transitioning to the touch experience mode presents a simplified UI environment optimized for touch interaction. For instance, a user may scroll the text document 916 within the application UI 902 via touch interaction with the display 120. This is not intended to be limiting, however, and in at least some implementations the touch experience mode also allows for other input mechanisms, such as via a hardware keyboard, a mouse, a touchpad, and so forth.

Notice that in FIGS. 7-9, experience mode transitions occur without interrupting an application context. For instance, content and user interaction contexts of the different application UIs are preserved across the transition between the experience mode changes. Thus, while visual arrangement of an application window may change, the content and user interaction contexts remains consistent, e.g., do not change. This notion of consistent application context across experience mode transitions applies to various different types of applications, such as to the desktop apps 130, the immersive apps 132, and so forth.

Figure 10:
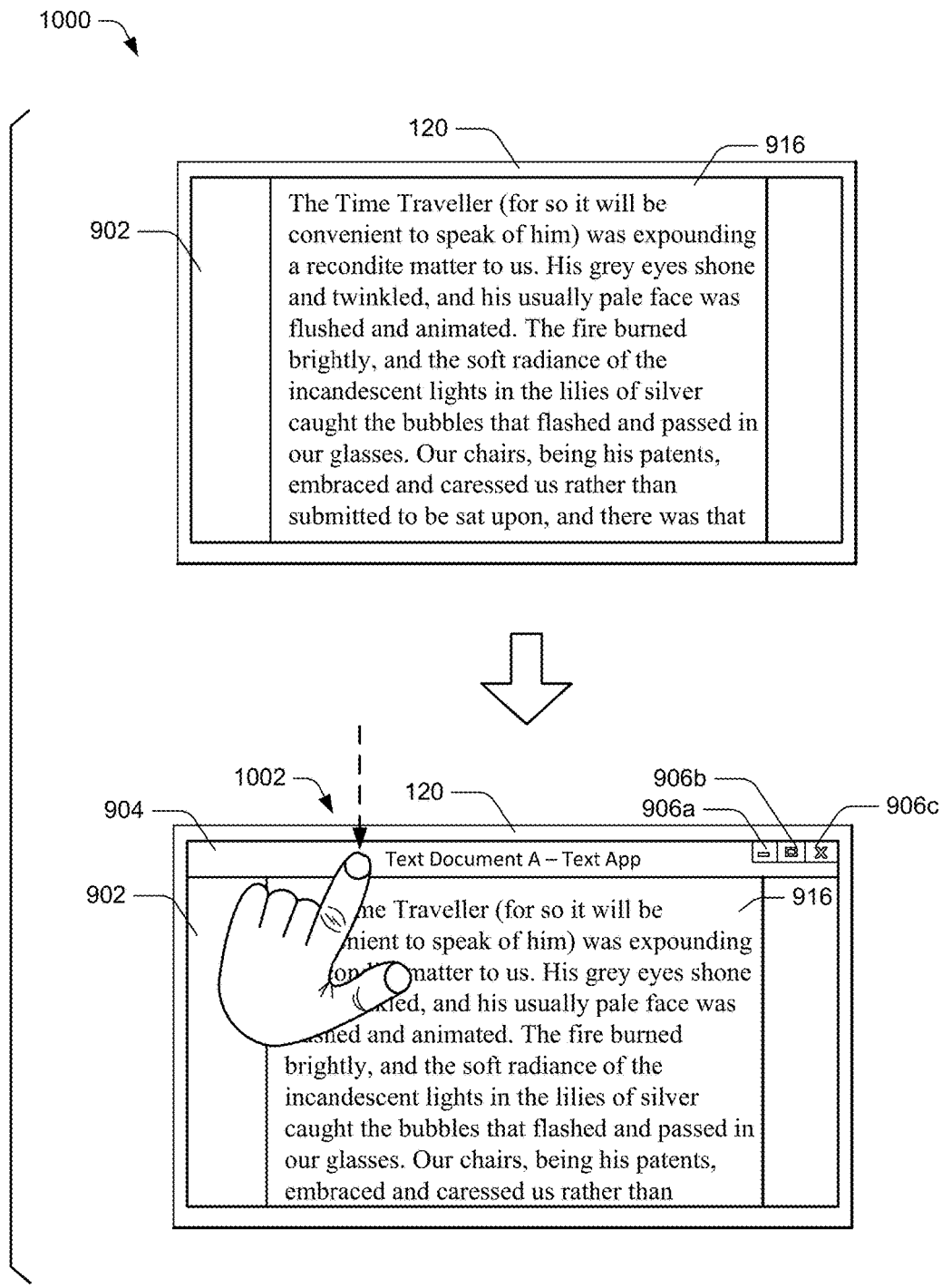
FIG. 10 illustrates an example implementation scenario for displaying a title bar in accordance with one or more embodiments.

FIG. 10 illustrates an example implementation scenario 1000 for displaying a title bar in accordance with one or more implementations. The upper portion of the scenario 1000 illustrates the application UI 902 with the text document 916 displayed on the display 120 and configured in the touch experience mode. In at least some implementations, the scenario 1000 represents an extension of the scenario 900 discussed above.

Continuing to the lower portion of the scenario 1000, a user provides a touch interaction 1002 with an upper portion of the display 120. The user, for instance, swipes their finger downward from the top border of the display 120. In response to the touch interaction, the title bar 904 is displayed. Additionally or alternatively to the touch interaction 1002, a user may utilize a different type of input to cause the title bar 904 to be displayed, such as pressing a particular key on a hardware keyboard, hovering a cursor adjacent to the upper border of the display 120, and so forth.

In at least some implementations, when the title bar 904 is presented in the touch experience mode, the window controls 906 are presented. The window controls 906 generally include a window minimize control 906a, a window restore control 906*b*, and a window close control 906*c*. According to various implementations, selection of the window minimize control 906*a* in the touch experience mode causes the application UI 902 to be removed from the display 120. Further, selection of the window close control 906*c* causes the application UI 902 and/or an application represented by the application UI 902 to be closed.

While in the touch experience mode, selection of the window restore control 906*b* generally represents a mode change trigger that causes a transition from the touch experience mode to the desktop experience mode. For instance, the confirmation prompt 706 is presented in response to selection of the window restore control 906*b*. Generally, the confirmation prompt 706 includes selectable controls for enabling a user to proceed with transitioning between experience modes, or to cancel transitioning between experience modes. Alternatively, the confirmation prompt 706 is not presented, and the display 120 is automatically reconfigured into the desktop experience mode in response to selection of the window restore control 906*b*. Thus, in at least some implementations, selecting the window restore control 906*b* and/or other mode change trigger causes the application UI 902 to be reconfigured from the touch experience mode as displayed in FIG. 10, to the desktop experience mode as displayed in the upper portion of FIG. 9.

When a user causes the title bar 904 to be displayed while in the touch experience mode, the title bar 904 may be displayed for a period of time (e.g., n seconds), and then automatically removed. Alternatively, the title bar 904 may persist in the application UI 902 until a user provides further input to collapse the title bar 904.

Figure 11:
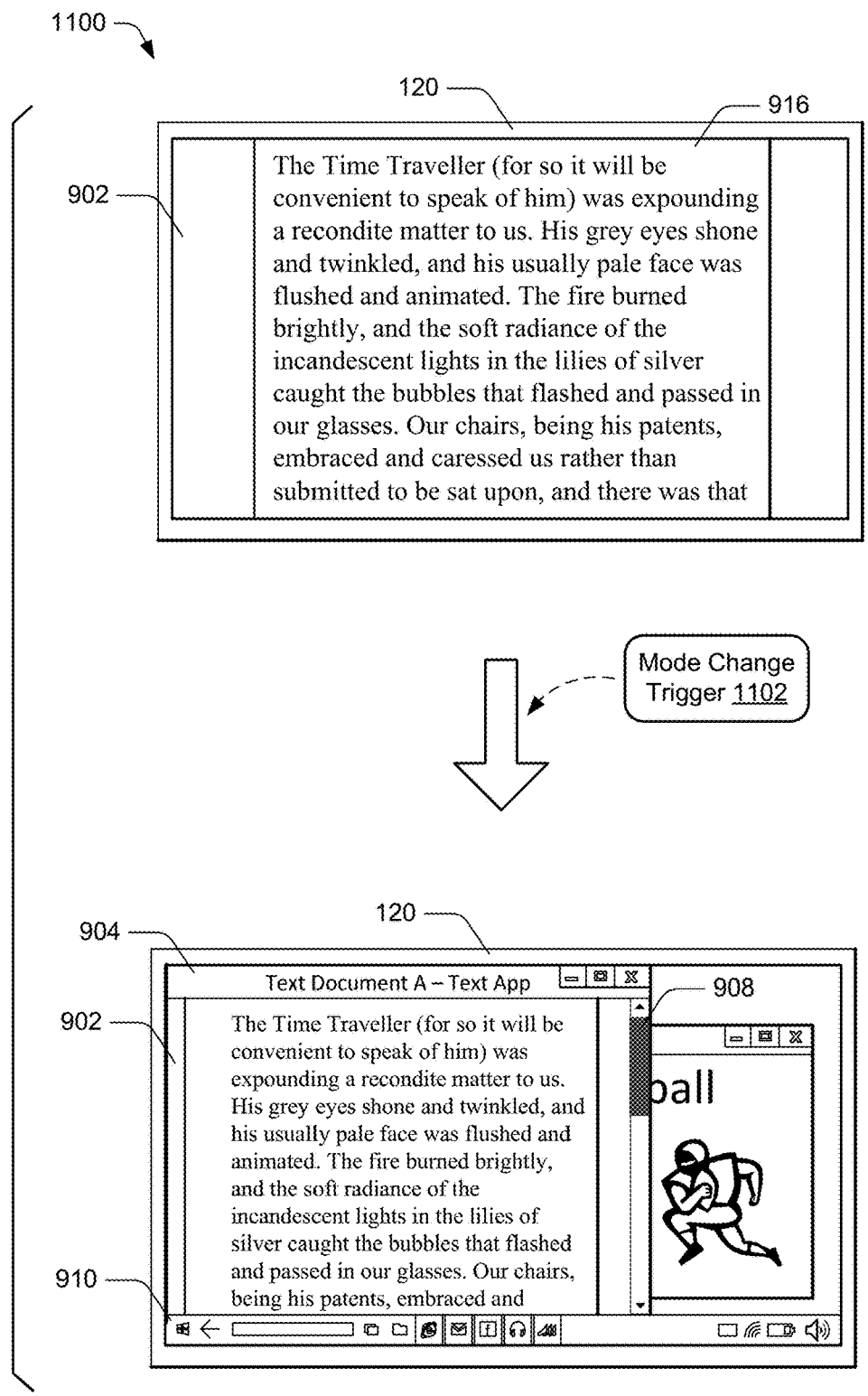
FIG. 11 illustrates an example implementation scenario for an experience mode change in accordance with one or more embodiments.

FIG. 11 illustrates an example implementation scenario 1100 for an experience mode change in accordance with one or more implementations. In at least some implementations, the scenario 1100 represents a continuation of the scenarios 900 and/or 1000, discussed above. The upper portion of the scenario 1100 illustrates the application UI 902 with its text document 916 displayed on the display 120 configured in the touch experience mode.

Proceeding to the lower portion of the scenario 1100, a mode change trigger 1102 is received. Generally, the mode change trigger 1102 indicates a change from the touch experience mode to the desktop experience mode.

In response to the mode change trigger 1102, the visual configuration of the display 120 is reconfigured from the touch experience mode to the desktop experience mode. For example, various visualizations and affordances associated with the desktop experience mode are displayed on the display 120, such as the title bar 904 and the navigation bar 908 in the application UI 902, the status bar 910 in the lower portion of the display 120, and so forth.

Further, notice that the visual context of the display 120 matches that illustrated in the upper portion of the scenario 900. Consider, for example, that the scenarios 900-1100 represent a transition from the desktop experience mode to the touch experience mode, and then a further transition from the touch experience mode back to the desktop experience mode. The scenarios, for instance, represent a "round trip" between the different experience modes. Accordingly, the scenarios 900-1100 illustrates that implementations discussed herein allow for visual and interactive contexts of applications to be maintained across multiple experience mode transitions.

Figure 12:
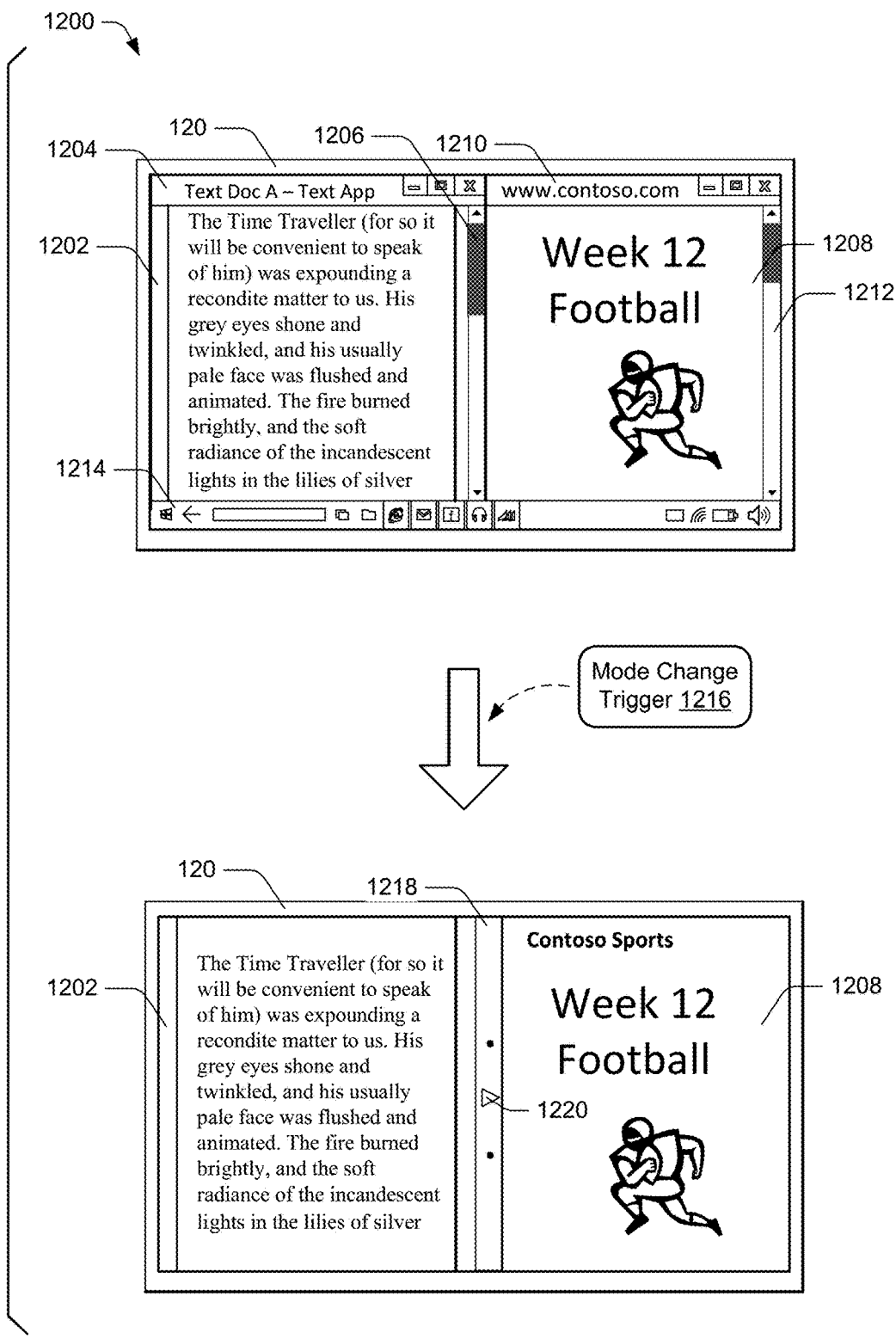
FIG. 12 illustrates an example implementation scenario for an experience mode change in accordance with one or more embodiments.

FIG. 12 illustrates an example implementation scenario 1200 for an experience mode change in accordance with one or more implementations. The upper portion of the scenario 1200 illustrates the display 120 displaying an application UI 1202 with a title bar 1204 and a navigation bar 1206, and an application UI 1208 with a title bar 1210 and a navigation bar 1212. The display 120 further displays a status bar 1214. According to various implementations, the upper portion of the scenario 1200 represents the display 120 configured according to the desktop experience mode. In this particular example, the application UI 1202 and the application UI 1208 are "snapped" into a particular visual arrangement, e.g., into different halves of the display 120. For instance, the application UI 1202 and the application UI 1208 occupy different respective portions of the display 120 and do not occlude or overlay one another.

Proceeding to the lower portion of the scenario 1200, a mode change trigger 1216 is received. Generally, the mode change trigger corresponds to an indication of a change from the desktop experience mode to the touch experience mode.

In response to the mode change trigger 1216, the display 120 is reconfigured from the desktop experience mode to the touch experience mode. For instance, the title bar 1204 and the navigation bar 1206 are removed from the application UI 1202. Further, the title bar 1210 and the navigation bar 1212 are removed from the application UI 1208. The status bar 1214 is also removed from the display 120. As discussed with reference to other scenarios detailed herein, the touch experience mode presents a simplified visual experience optimized for touch input.

Notice that in transitioning from the desktop experience mode in the upper portion of the scenario 1200 to the touch experience mode in the lower portion of the scenario 1200, the spatial relationship between the application UI 1202 and the application UI 1208 is maintained. For instance, the application UI 1202 and the application UI 1208 shared the display 120 in the desktop experience mode, and continue to do so across the transition to the touch experience mode. Thus, in at least some implementations, application UIs that share a display area such that the UIs occupy different portions of a display and do not occlude one another in a desktop experience mode, continue to share the display area across a transition to the touch experience mode. According to various implementations, this behavior of the application UIs 1202, 1208 is specified and enforced via the window state mappings 126.

The scenario 1200 further illustrates that in transitioning to the touch experience mode, a divider 1218 is inserted between the application UI 1202 and the application UI 1208. Generally, the divider 1218 represents a visual affordance that separates the application UI 1202 and the application UI 1208, and enables various functionalities in relation to the respective UIs. For instance, a user can manipulate the divider 1218 to resize the application UIs. For example, dragging the divider 1218 to the right in the display 120 increases the width of the application UI 1202 and decreases the width of the application UI 1208. Conversely, dragging the divider 1218 to the left in the display 120 increases the width of the application UI 1208 and decreases the width of the application UI 1202.

According to various implementations, dragging the divider 1218 past a threshold distance to the right or left of the display 120 causes a particular application UI to be removed from the display 120. For instance, dragging the divider 1218 a threshold distance to the right of the display 120 causes the application UI 1208 to be removed from the display 120 and the application UI 1202 to be maximized in the display 120. Conversely, dragging the divider 1218 a threshold distance to the left of the display 120 causes the application UI 1202 to be removed from the display 120 and the application UI 1208 to be maximized in the display 120.

The divider 1218 includes a focus indicator 1220, which indicates which of the application UIs 1202, 1208 currently has focus in the display 120. In this particular example, the focus indicator 1220 points to the application UI 1208 thus indicating that the application UI 1208 currently has focus.

Similarly to the scenario 1000 discussed with reference to FIG. 10, a user may interact with the application UI 1202 and/or the application UI 1208 in the touch experience mode to enable the respective title bars to be displayed. For instance, touch input and/or other form of input to an upper portion of an application UI causes its respective title bar to be displayed. In at least some implementations, the title bar is displayed temporarily (e.g., for n seconds), and then automatically removed.

Figure 13:
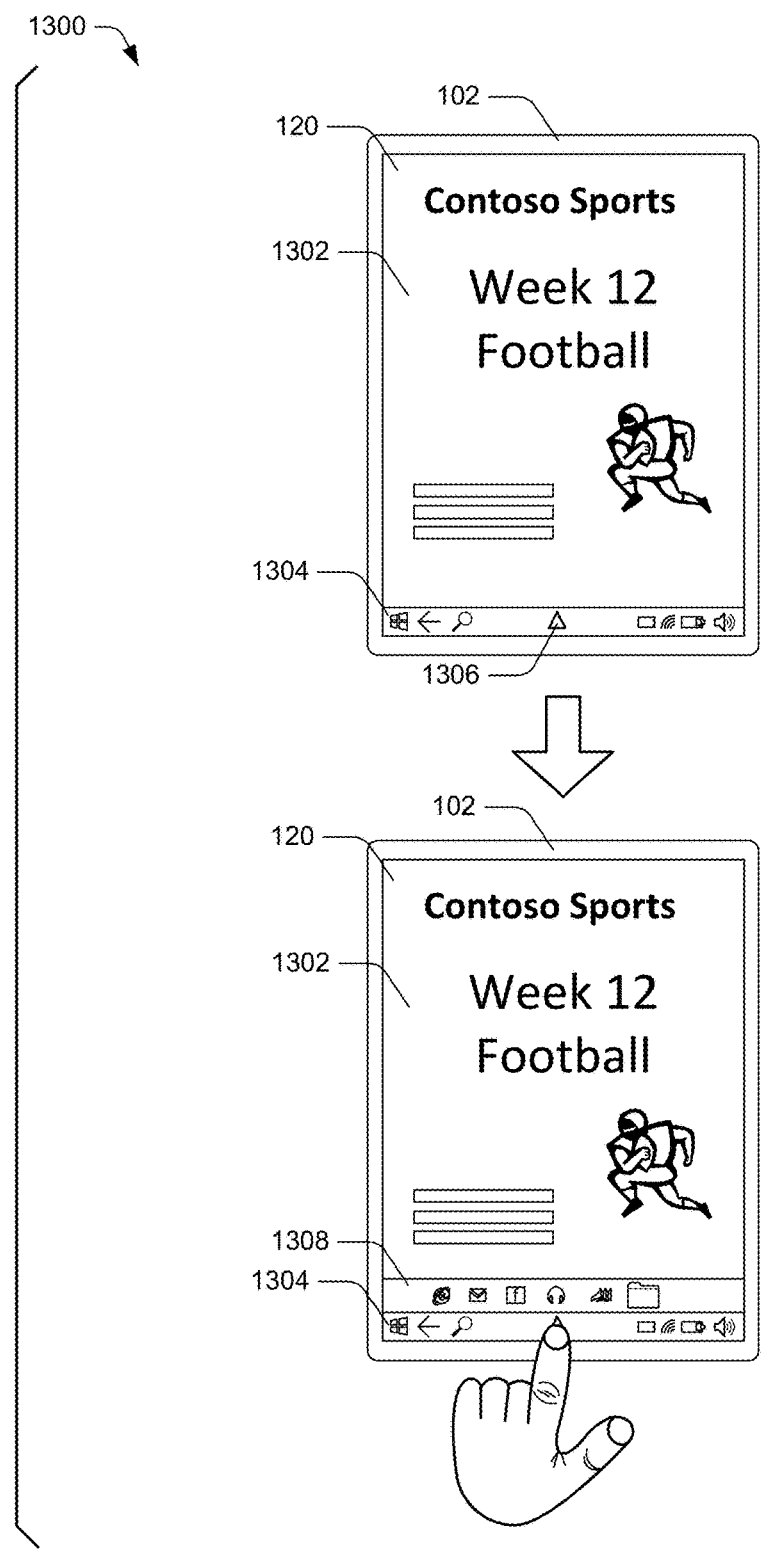
FIG. 13 illustrates an example implementation scenario for a collapsible status bar in accordance with one or more embodiments.

FIG. 13 illustrates an example implementation scenario 1300 for a collapsible status bar in accordance with one or more implementations. The upper portion of the scenario 1300 includes the computing device 102 with the display 120. The display 120 displays an application UI 1302. In this particular implementation, the display 120 may be configured according to one of the touch experience mode or the desktop experience mode.

The display 120 further displays a status bar 1304 that includes system functionality such as a menu control for invoking a system menu, a search control for invoking a search, a back button for navigating to previous window versions, status indicators for various system states, and so forth. The status bar 1304 further includes an extension control 1306 that is selectable to cause an extension of the status bar 1304 to be presented.

Continuing to the lower portion of the scenario 1300, a user selects the extension control 1306, which causes a status bar extension 1308 to be presented. Generally, the status bar extension 1308 represents an extension of the status bar 1304 that presents further status information for the computing device 102. For instance, the status bar extension 1308 includes visual indicia of applications that are active/launched on the computing device 102, and/or visual indicia that are selectable to cause applications to be launched on the computing device 102. According to various implementations, visual indicia displayed in the status bar extension 1308 are selectable to cause an associated application UI, system menu, system folder, and so forth, to be displayed in the display 120. Thus, the scenario 1300 illustrates that that status bar extension 1308 can be hidden until a user selects the extension control 1306, at which point the status bar extension is displayed.

According to various implementations, a selection of the extension control 1306 while the status bar extension 1308 is displayed causes the status bar extension 1308 to be collapsed, e.g., to be removed from the display 120. For instance, selection of the extension control 1308 causes the status bar 1304 to be displayed without the status bar extension 1308, such as illustrated in the upper portion of the scenario 1300. Alternatively or additionally, the status bar extension 1308 automatically collapses after a particular period of time elapses after selection of the extension control 1306 and/or after a user interaction with the status bar extension 1308, e.g., after n seconds.

Thus, the scenario 1300 illustrates that an abbreviated version of the status bar 1304 is persistently displayed, and that the status bar extension 1308 is collapsed until a user input requesting display of the status bar extension 1308. Accordingly, screen space on the display 120 is conserved by hiding the status bar extension 1308 until a user requests it, and by removing the status bar extension 1308 after a certain time elapses and/or in response to user input to collapse the status bar extension 1308.

Figure 14:
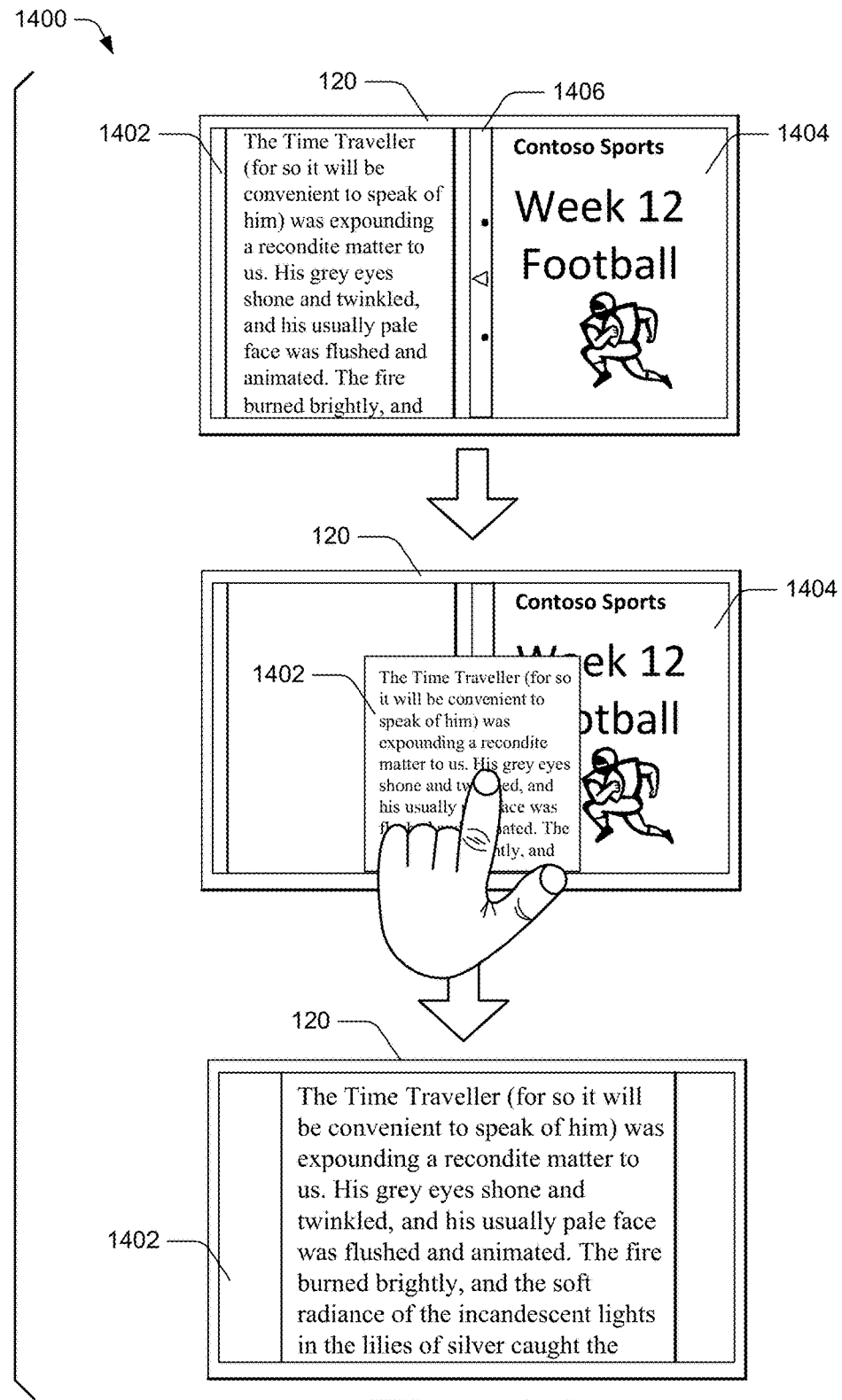
FIG. 14 illustrates an example implementation scenario for moving a window in a touch experience mode in accordance with one or more embodiments.

FIG. 14 illustrates an example implementation scenario 1400 for moving a window in a touch experience mode in accordance with one or more implementations. The upper portion of the scenario 1400 includes the display 120 configured in the touch experience mode, including an application UI 1402, an application UI 1404, and a divider 1406. Consider for purposes of this example that the application UI 1402 is for a desktop application 116, such as for a desktop word processing application.

Proceeding to the center portion of the scenario 1400, a user drags the application UI 1402 toward the center of the display 120. The user, for instance, provides touch input to the application UI 1402 and drags with application UI 1402 toward the center of the display 120. As illustrated, this causes the application UI 1402 to vacate the left side of the display 120 and move toward the center of the display 120.

Continuing to the lower portion of the scenario 1400, the user drops (e.g., releases) the application UI 1402 approximately in the center of the display 120. In response to dropping the application UI 1402 around the center of the display 120, the application UI 1402 maximizes to fill the available display area of the display 120. Thus, the application UI 1402 fills the display 120 and occludes the application UI 1404.

As referenced above, the application UI 1402 is for a desktop application 130. Accordingly, the scenario 1400 illustrates that when a desktop application UI is manipulated and dropped around the center of a display while in a touch experience mode, the desktop application UI will maximize in the display.

Consider further that the application UI 1404 represents an immersive application 132. While not expressly illustrated here, a similar behavior as observed with reference to the application UI 1402 would apply if a user were to manipulate the application UI 1404 for an immersive application 132 toward the center of the display 120, and drop the application UI 1404. Thus, similar and/or identical window behaviors may be applied to both desktop applications 116 and immersive applications 116 while in a touch experience mode.

Figure 15:
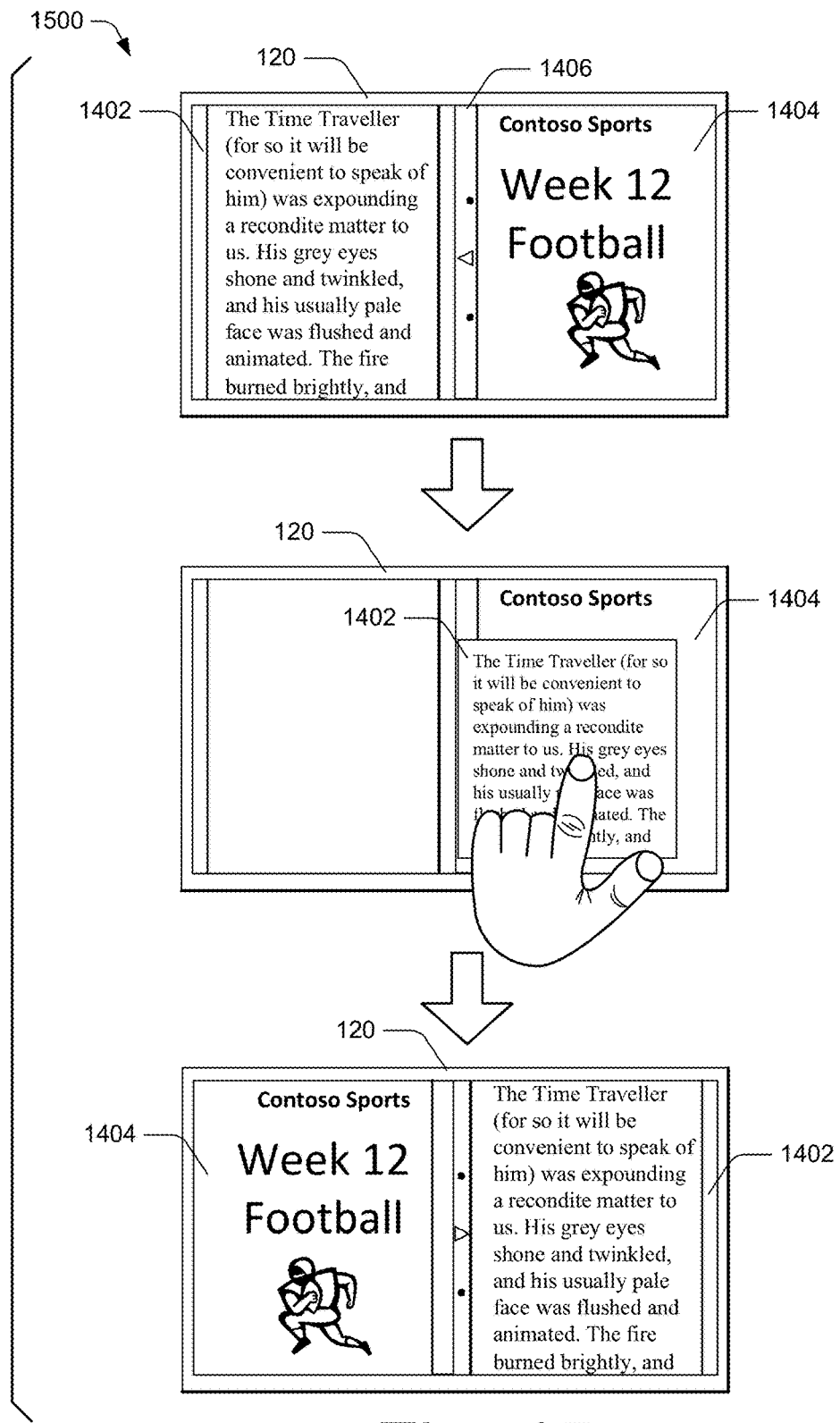
FIG. 15 illustrates an example implementation scenario for moving a window in a touch experience mode in accordance with one or more embodiments.

FIG. 15 illustrates an example implementation scenario 1500 for moving a window in a touch experience mode in accordance with one or more implementations. The upper portion of the scenario 1500 includes the display 120 configured in the touch experience mode, including the application UI 1402, the application UI 1404, and the divider 1406. As referenced above, the application UI 1402 is for a desktop application 130, such as for a desktop word processing application.

Proceeding to the center portion of the scenario 1500, a user drags the application UI 1402 toward the right side the display 120. The user, for instance, provides touch input to the application UI 1402 and drags with application UI 1402 to the right side of the display 120. As illustrated, this causes the application UI 1402 to vacate the left side of the display 120 and move to the right side of the display 120.

Continuing to the lower portion of the scenario 1500, the user drops (e.g., releases) the application UI 1402 at the right side of the display 120. In response to dropping the application UI 1402 at the right side of the display 120, the application UI 1402 snaps into the right side of the display 120. Further, the application UI 1404 pops out of the right side of the display 120 and snaps into the left side of the display 120. Thus, dropping the application UI 1402 at the right side of the display 120 causes the application UI 1402 and the application UI 1404 to trade positions in the display 120.

As referenced above, the application UI 1402 is for a desktop application 130. Accordingly, the scenario 1400 illustrates that when a desktop application UI is manipulated and dropped at the side of a display while in a touch experience mode, the desktop application UI will into the side of the display. Further, if a different application UI is currently display in that side of the display, the different application UI will assume the original position of the desktop application UI.

As referenced above, consider that the application UI 1404 represents an immersive application 132. While not expressly illustrated here, a similar behavior as observed with reference to the application UI 1402 would apply if a user were to manipulate the application UI 1404 for the immersive application 132 toward the left side of the display 120, and drop the application UI 1404 at the left side. For instance, the application UI 1404 would snap into the left side of the display 120, and the application UI 1402 would snap into the right side of the display 120. Thus, similar and/or identical window behaviors may be applied to both desktop applications 116 and immersive applications 116 while in a touch experience mode.

According to various implementations, the window behaviors illustrated in the scenarios 1400, 1500 represent a restricted set of allowed window behaviors that are enforced in a touch experience mode. For instance, half window snapping (e.g., left side snapping and right side snapping) and window maximize may represent the only allowed window movement and position behaviors for a touch experience mode. Accordingly, the scenarios 1400, 1500 illustrates that in at least some implementations, a limited set of window behaviors are enforced while in a touch experience mode, and window behaviors outside of the limited set are not allowed or performed. Further, the limited set of behaviors is applied equally to both desktop applications 116 and immersive applications 116 while in the touch experience mode.

Figure 16:
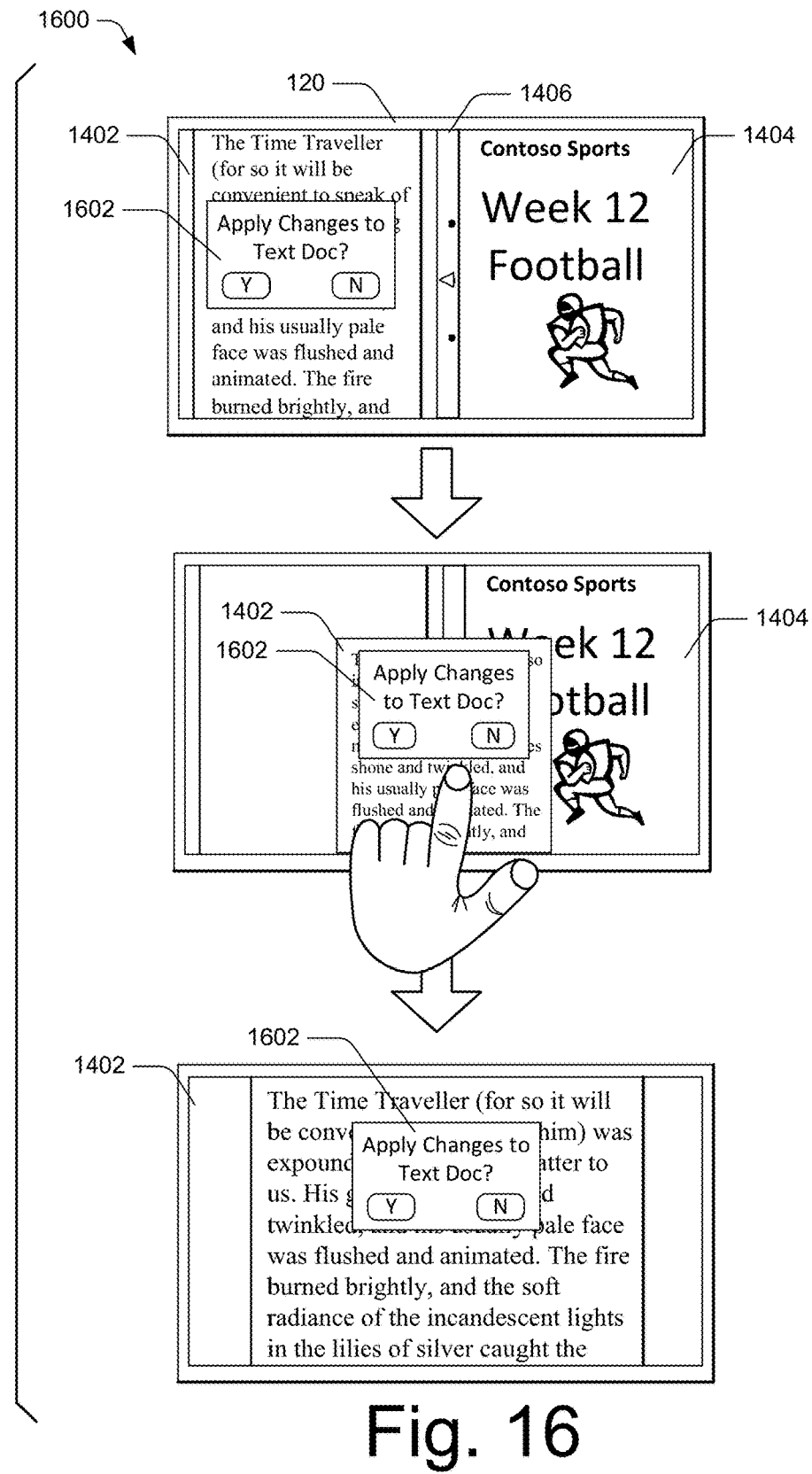
FIG. 16 illustrates an example implementation scenario for moving a dialogue box in a touch experience mode in accordance with one or more embodiments.

FIG. 16 illustrates an example implementation scenario 1600 for moving a dialogue box in a touch experience mode in accordance with one or more implementations. The upper portion of the scenario 1600 includes the display 120 configured in the touch experience mode, including the application UI 1402, the application UI 1404, and the divider 1406. As referenced above, the application UI 1402 is for a desktop application 116, such as for a desktop word processing application.

Further illustrated is a dialogue box 1602 associated with the application UI 1402. Generally, the dialogue box 1602 communicates application-related information to a user, and prompts the user for a response and/or input. The dialogue box 11602, for instance, is a modal dialogue box that prompts the user to perform an action.

Proceeding to the center portion of the scenario 1600, a user drags the application UI 1402 toward the center of the display 120. The user, for instance, provides touch input to the application UI 1402 and drags with application UI 1402 toward the center of the display 120. As illustrated, this causes the application UI 1402 to vacate the left side of the display 120 and move toward the center of the display 120. Further illustrated is that the dialogue box 1602 moves along with the application UI 1602.

Continuing to the lower portion of the scenario 1600, the user drops (e.g., releases) the application UI 1402 approximately in the center of the display 120. In response to dropping the application UI 1402 around the center of the display 120, the application UI 1402 maximizes to fill the available display area of the display 120. Further, the dialogue box 1602 remains in the foreground of the application UI 1402. According to various implementations, the dialogue box 1602 remains tied to the application UI 1402 and in the foreground of the application UI 1402 until an action occurs to dismiss the dialogue box 1602, such as user input performing an action, an occurrence of a system action, and so forth. Further, movement of the application UI 1402 causes a corresponding movement of the dialogue box 1602. For instance, the dialogue box 1602 is visually tied to the application UI 1402 until an action and/or event occurs that dismisses the dialogue box 1602. Accordingly, when an application UI is manipulated according to the various window behaviors discussed herein, a dialogue box associated with the application UI will be correspondingly moved along the application UI.

FIG. 17 illustrates example window state mappings 1700 in accordance with one or more implementations. The window state mappings 1700, for instance, represents an implementation of the window state mappings 126 introduced with reference to FIG. 1.

Generally, the window state mappings 1700 correlate window states (e.g., application UI states) between different experience modes. For instance, the window state mappings 1700 include a desktop experience column 1702 and a touch experience column 1704. Generally, the desktop experience column 1702 specifies particular window states that occur in a desktop experience mode, and the touch experience column 1704 specifies corresponding window states in a touch experience mode.

For instance, consider a window state mapping 1706 which specifies a desktop experience window state corresponding to a window that is non-snapped and has focus, such as a window that is maximized or restored. The corresponding touch experience window state is a window that is maximized. Thus, when an experience mode transition occurs from a desktop experience mode to a touch experience mode, a window that is non-snapped and has focus (e.g., a window that is maximized or restored) will be maximized in the touch experience mode. One example of applying this mapping is illustrated in FIG. 9.

Generally, the individual mappings specified in the window state mappings 1700 are two-way mappings that apply in both directions, e.g., based on experience mode transitions that occur in either direction. With reference to the window state mapping 1706, for instance, a transition from the touch experience mode to the desktop experience mode causes a maximized window in the touch experience mode to be displayed maximized or restored in the desktop experience mode.

A window state mapping 1708 specifies a mapping for a half snapped window in a desktop experience mode to a corresponding window state in the touch experience mode, and vice-versa. An example implementation of the window state mapping 1708 is illustrated in FIG. 12.

A window state mapping 1710 specifies a mapping for a quadrant snapped window in a desktop experience mode to a corresponding window state in the touch experience mode. According to various implementations, a quadrant snapped window corresponds to a window that is snapped into a corner of a display such that the window occupies less than half of the display, such as a quarter section of the display. In at least some implementations, quadrant display of windows is not permitted in the touch experience mode. Thus, as indicated by the window state mapping 1710, a quadrant snapped window that has focus in the desktop experience mode is displayed maximized in response to a transition to the touch experience mode.

In at least some implementations, a transition back to the desktop experience mode causes the window to be once again quadrant snapped, such as adjacent to other quadrant snapped windows. Thus, a transition from a first experience mode to a second experience mode, and a further transition back to the first experience mode preserves a visual and interactive context of the first experience mode. Such a scenario is discussed above with reference to the scenarios 900-1100.

These particular window state mappings 1700 are presented for purpose of example only, and it is to be appreciated that a variety of other window state mappings may be specified within the spirit and scope of the disclosed implementations. Thus, the window state mappings 1700 generally represent the notion that implementations enable window state transition rules to be specified based on window state mappings such that a window state in one experience mode has a corresponding window state in another experience mode. Further, the window state mappings 1700 are specified to obey window layout rules for the different experience modes such as a transition from one experience mode to a different experience mode does not violate window layout rules for the different experience mode.

The example scenarios and implementations discussed above are presented for purpose of example only, and are provided to illustrate general principles of configuring a user interface based on an experience mode transition. Thus, variations, combinations, and permutations of the illustrated scenarios may occur while remaining within the spirit and scope of the claimed implementations.

Figure 18:
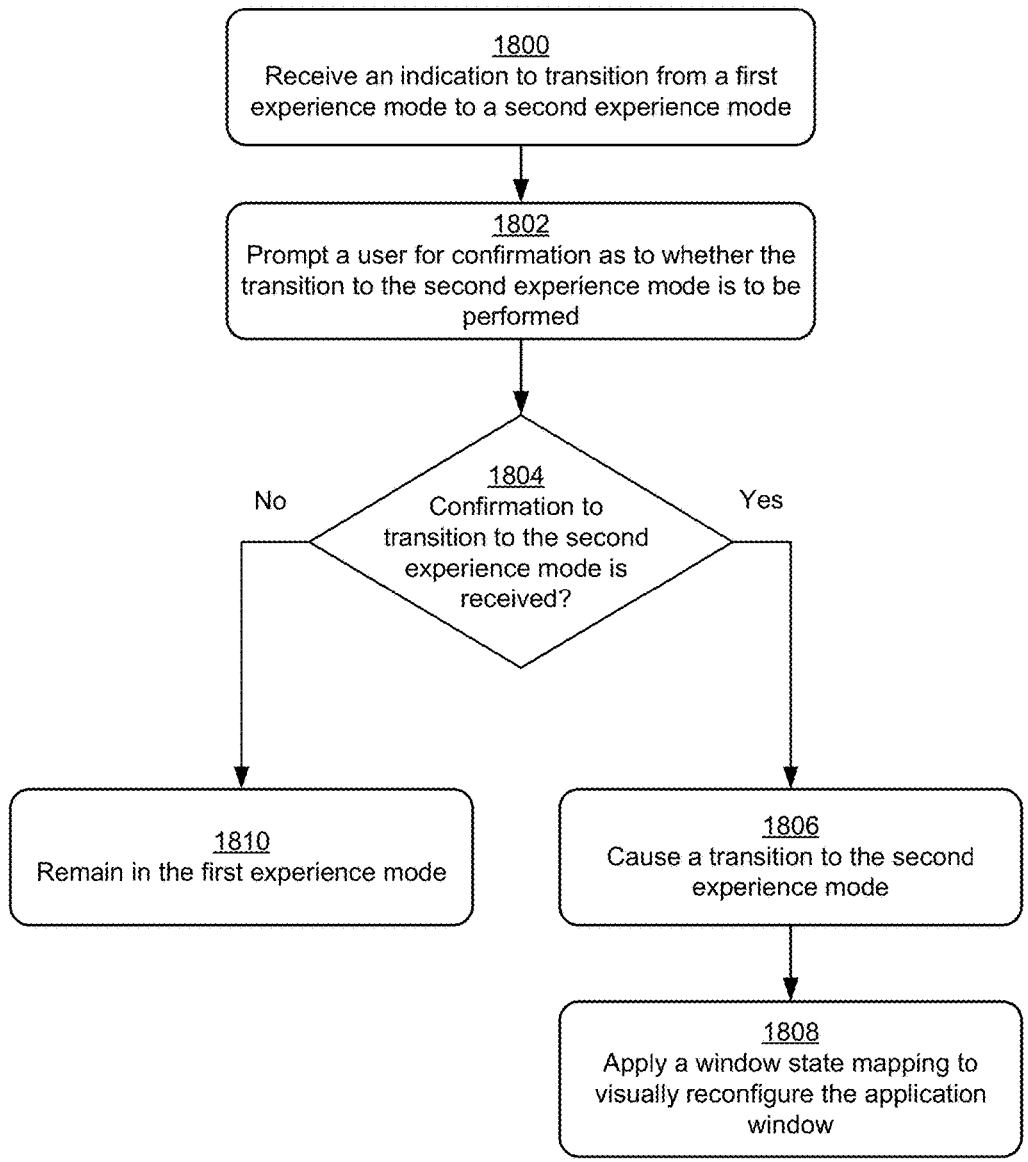
FIG. 18 is a flow diagram that describes steps in a method for a transition between experience modes in accordance with one or more embodiments.

FIG. 18 is a flow diagram that describes steps in a method in accordance with one or more embodiments. The method, for instance, describes an example procedure for a transition between experience modes in accordance with one or more embodiments. In at least some implementations, the method represents a detailed way of performing the method described above with reference to FIG. 2.

Step 1800 receives an indication to transition from a first experience mode to a second experience mode. The experience mode module 110, for instance, receives an indication of a mode change trigger, examples of which are detailed elsewhere herein. Generally, the indication to transition to the second experience mode is an indication to transition from one experience mode to another experience mode, such as from a desktop experience mode to a touch experience mode, from a touch experience mode to a desktop experience mode, and so forth.

According to various implementations, the indication to transition to the second experience mode is received while an application user interface is displayed in an application window on a display screen of a computing device and according to a particular user interaction context of the application user interface. Generally, a user interaction context refers to content that is displayed in the application user interface and a particular position within the content. For instance, in a scenario where a user is viewing and/or editing a text document in a text editing application user interface, the user interaction context includes a portion of text displayed in the application user interface.

Step 1802 prompts a user for confirmation as to whether the transition to the second experience mode is to be performed. The prompt may take various forms and may be presented to a user in various ways, such as a visual prompt, an audible prompt, and so forth. One example of such a prompt is the confirmation prompt 706 illustrated in FIG. 7 and discussed above.

Step 1804 ascertains whether confirmation to transition to the second experience mode is received. If confirmation to transition to the second experience mode is received ("Yes"), step 1806 causes a transition to the second experience mode. The confirmation to transition may be received in various ways. For instance, a user can provide input to confirm the transition, such as using a hardware input device, touch input, audible input, gesture-based input, and so forth. Alternatively or additionally, the confirmation may be implied. For instance, after a certain time period elapses (e.g., n seconds) after a prompt to confirm the transition is presented, the transition to the second experience mode may occur without express user input confirming the transition.

Examples of transitioning to a different experience mode are detailed throughout this discussion and the accompanying drawings, and generally include reconfiguring visual and functional attributes of an operating environment of a computing device. As referenced above, the indication to transition from the first experience mode occurs while an application user interface is displayed. Thus, transitioning from the first experience mode to the second experience mode includes visually reconfiguring the application user interface according to the second experience mode.

For instance, when the transition is a transition from a desktop experience mode to a touch experience mode, reconfiguring the application user interface includes removing one or more user interface elements from the application user interface while maintaining the user interaction context of the application user interface. Generally, a user interface element refers to visualizations and affordances displayed as part of an application user interface, such as a title bar, a navigation control (e.g., a navigation bar), and so forth.

Conversely, when the transition is a transition from a touch experience mode to a desktop experience mode, reconfiguring the application user interface includes adding one or more user interface elements to the application user interface while maintaining the user interaction context for the application user interface.

Step 1808 applies a window state mapping to visually reconfigure a window for the application user interface. For instance, a window in which the application user interface is displayed is reconfigured from a first experience mode window state to a second experience mode window state. Generally, the first experience mode window state corresponds to a particular window state in the first experience mode, and the second experience mode window state corresponds to a particular window state in the second experience mode. In at least some implementations, the mapping is determined utilizing the window state mappings 126, detailed elsewhere herein. Examples of reconfiguring window states are presented in the implementation scenarios discussed above. According to various implementations, applying the window state mapping occurs automatically in response to the transition from the first experience mode to the second experience mode, and occurs independent of user input to apply the window state mapping.

If confirmation to transition to the second experience mode is not received ("No"), step 1810 remains in the first experience mode. The transition to the second experience mode is thus not performed. The lack of confirmation to transition to the second experience mode may take various forms. For instance, a user may provide input specifying that the transition to the second experience mode is not to be performed, such as input cancelling the transition. Alternatively or additionally, absent express input confirming the transition, the transition may be automatically cancelled. For instance, if user input confirming the transition is not received within a certain time period (e.g., n seconds) after a prompt to confirm the transition is presented, the transition to the second experience mode is cancelled.

Figure 19:
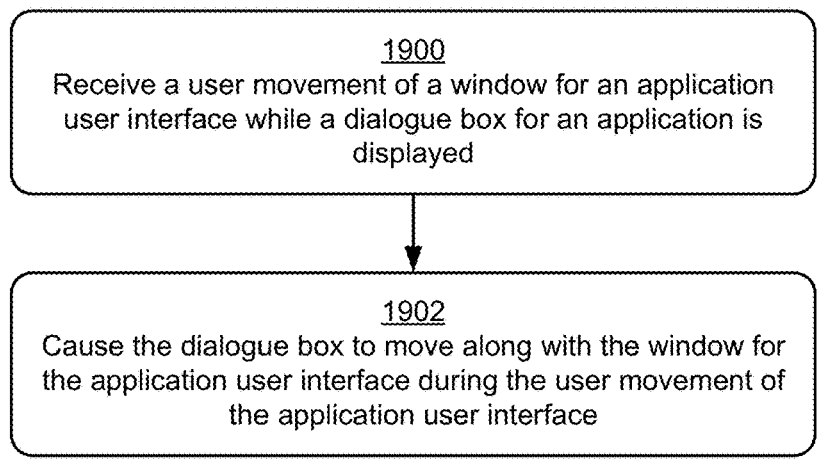
FIG. 19 is a flow diagram that describes steps in a method for moving a dialogue box along with an application user interface in accordance with one or more embodiments.

FIG. 19 is a flow diagram that describes steps in a method in accordance with one or more embodiments. The method, for instance, describes an example procedure for moving a dialogue box along with an application user interface in accordance with one or more embodiments. In at least some implementations, the method describes an example procedure for performing the implementation scenario 1600 discussed above. According to various implementations, the method is an extension of one or more of the methods described above with reference to FIGS. 2 or 18.

Step 1900 receives a user movement of a window for an application user interface while a dialogue box for an application is displayed. Generally, the user movement occurs in the touch experience mode and while the dialogue box is displayed in a foreground of the application user interface. In at least some implementations, the dialogue box is a modal dialogue box.

Step 1902 causes the dialogue box to move along with the window for the application user interface during the user movement of the application user interface. The dialogue box, for instance, remains in the foreground of the application user interface and remains within the window during movement of the window.

Figure 20:
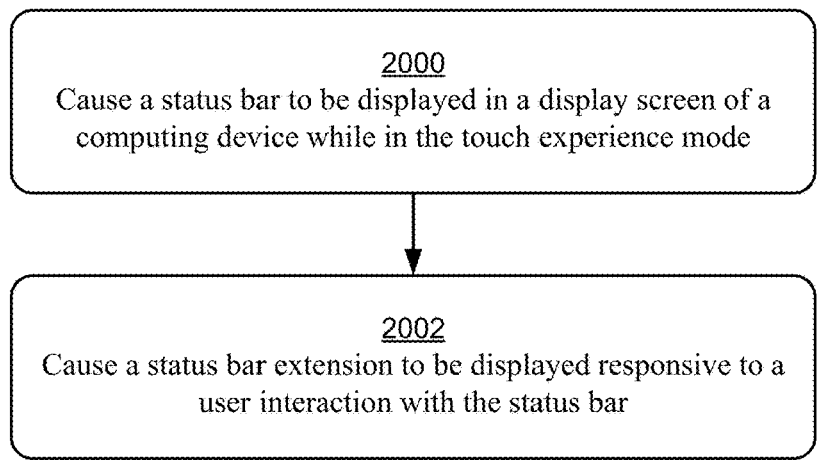
FIG. 20 is a flow diagram that describes steps in a method for displaying a status bar extension in accordance with one or more embodiments.

FIG. 20 is a flow diagram that describes steps in a method in accordance with one or more embodiments. The method, for instance, describes an example procedure for displaying a status bar extension in accordance with one or more embodiments. In at least some implementations, the procedure describes an example method for performing the implementation scenario 1300 discussed above. According to various implementations, the method is an extension of one or more of the methods described above with reference to FIGS. 2, 18, or 19.

Step 2000 causes a status bar to be displayed in a display screen of a computing device while in the touch experience mode. The status bar generally includes one or more system status indicators for the computing device, examples of which are discussed above with reference to FIG. 13.

Step 2002 causes a status bar extension to be displayed responsive to a user interaction with the status bar. Generally, the status bar extension includes one or more of a visual indicator of an application that is active on the computing device, a visual indicator that is selectable to launch an application on the computing device, a visual indicator of a document that is open on the computing device, and so forth.

Having discussed some example procedures and implementation scenarios for configuring a user interface based on an experience mode transition, consider now a discussion of an example system and device for performing various aspects of the procedures and implementation scenarios for configuring a user interface based on an experience mode transition in accordance with one or more implementations.

Example System and Device

Figure 21:
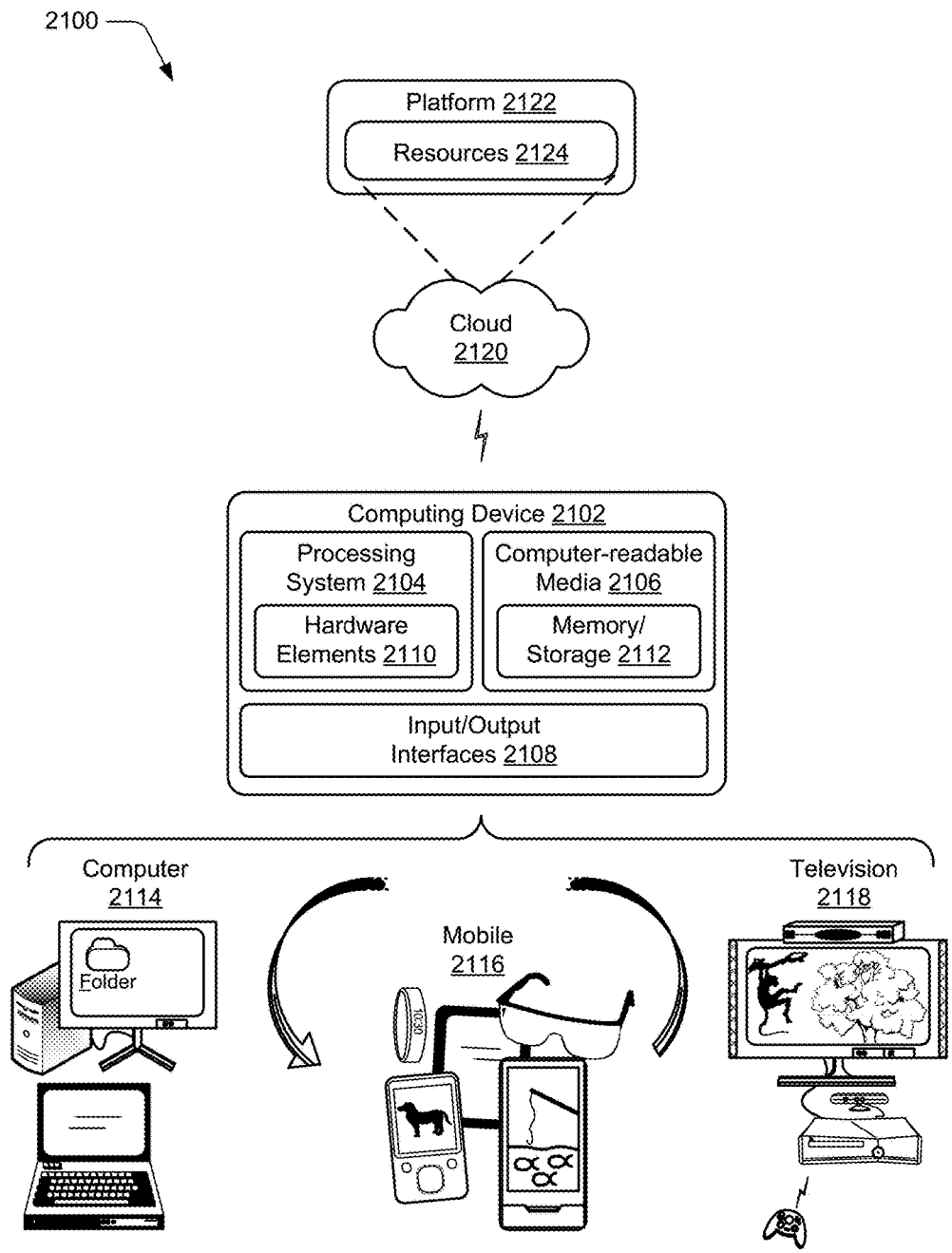
FIG. 21 illustrates an example system and computing device as described with reference to FIG. 1, which are configured to implement embodiments of techniques described herein.

FIG. 21 illustrates an example system generally at 2100 that includes an example computing device 2102 that is representative of one or more computing systems and/or devices that may implement various techniques described herein. For example, the computing device 102 discussed above with reference to FIG. 1 can be embodied as the computing device 2102. The computing device 2102 may be, for example, a server of a service provider, a device associated with the client (e.g., a client device), an on-chip system, and/or any other suitable computing device or computing system.

The example computing device 2102 as illustrated includes a processing system 2104, one or more computer-readable media 2106, and one or more Input/Output (I/O) Interfaces 2108 that are communicatively coupled, one to another. Although not shown, the computing device 2102 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 2104 is representative of functionality to perform one or more operations using hardware. Accordingly, the processing system 2104 is illustrated as including hardware element 2110 that may be configured as processors, functional blocks, and so forth. This may include implementation in hardware as an application specific integrated circuit or other logic device formed using one or more semiconductors. The hardware elements 2110 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 2106 is illustrated as including memory/storage 2112. The memory/storage 2112 represents memory/storage capacity associated with one or more computer-readable media. The memory/storage 2112 may include volatile media (such as random access memory (RAM)) and/or nonvolatile media (such as read only memory (ROM), Flash memory, optical disks, magnetic disks, and so forth). The memory/storage 2112 may include fixed media (e.g., RAM, ROM, a fixed hard drive, and so on) as well as removable media (e.g., Flash memory, a removable hard drive, an optical disc, and so forth). The computer-readable media 2106 may be configured in a variety of other ways as further described below.

Input/output interface(s) 2108 are representative of functionality to allow a user to enter commands and information to computing device 2102, and also allow information to be presented to the user and/or other components or devices using various input/output devices. Examples of input devices include a keyboard, a cursor control device (e.g., a mouse), a microphone (e.g., for voice recognition and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 2102 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," "entity," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 2102. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 2102, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media.

As previously described, hardware elements 2110 and computer-readable media 2106 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 2110. The computing device 2102 may be configured to implement particular instructions and/or functions corresponding to the software and/or hardware modules. Accordingly, implementation of modules that are executable by the computing device 2102 as software may be achieved at least partially in hardware, e.g., through use of computer-readable storage media and/or hardware elements 2110 of the processing system. The instructions and/or functions may be executable/operable by one or more articles of manufacture (for example, one or more computing devices 2102 and/or processing systems 2104) to implement techniques, modules, and examples described herein.

As further illustrated in FIG. 21, the example system 2100 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 2100, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 2102 may assume a variety of different configurations, such as for computer 2114, mobile 2116, and television 2118 uses. Each of these configurations includes devices that may have generally different constructs and capabilities, and thus the computing device 2102 may be configured according to one or more of the different device classes. For instance, the computing device 2102 may be implemented as the computer 2114 class of a device that includes a personal computer, desktop computer, a multi-screen computer, laptop computer, netbook, and so on.

The computing device 2102 may also be implemented as the mobile 2116 class of device that includes mobile devices, such as a mobile phone, portable music player, portable gaming device, a tablet computer, a wearable device, a multi-screen computer, and so on. The computing device 2102 may also be implemented as the television 2118 class of device that includes devices having or connected to generally larger screens in casual viewing environments. These devices include televisions, set-top boxes, gaming consoles, and so on.

The techniques described herein may be supported by these various configurations of the computing device 2102 and are not limited to the specific examples of the techniques described herein. For example, functionalities discussed with reference to the computing device 102 may be implemented all or in part through use of a distributed system, such as over a "cloud" 2120 via a platform 2122 as described below.

The cloud 2120 includes and/or is representative of a platform 2122 for resources 2124. The platform 2122 abstracts underlying functionality of hardware (e.g., servers) and software resources of the cloud 2120. The resources 2124 may include applications and/or data that can be utilized while computer processing is executed on servers that are remote from the computing device 2102. Resources 2124 can also include services provided over the Internet and/or through a subscriber network, such as a cellular or Wi-Fi network.

The platform 2122 may abstract resources and functions to connect the computing device 2102 with other computing devices. The platform 2122 may also serve to abstract scaling of resources to provide a corresponding level of scale to encountered demand for the resources 2124 that are implemented via the platform 2122. Accordingly, in an interconnected device embodiment, implementation of functionality described herein may be distributed throughout the system 2100. For example, the functionality may be implemented in part on the computing device 2102 as well as via the platform 2122 that abstracts the functionality of the cloud 2120.

Discussed herein are a number of methods that may be implemented to perform techniques discussed herein. Aspects of the methods may be implemented in hardware, firmware, or software, or a combination thereof. The methods are shown as a set of steps that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

Example implementations discussed herein include:

Example 1

A computer-implemented method including: receiving an indication to transition from a desktop experience mode to a touch experience mode while an application user interface is displayed in an application window on a display screen of a computing device and according to a particular user interaction context of the application user interface; causing the transition from the desktop experience mode to the touch experience mode, including visually reconfiguring the application user interface by performing one or more of removing one or more user interface elements from the application user interface or adding one or more user interface elements to the application user interface while maintaining the user interaction context of the application user interface; and applying a window state mapping to visually reconfigure a window for the application user interface from a desktop experience mode window state to a touch experience mode window state.

Example 2

The computer-implemented method as described in example 1, wherein the indication to transition from the desktop experience mode to the touch experience mode includes a mode change trigger caused by a hardware-based action.

Example 3

The computer-implemented method as described in one or more of examples 1 or 2, wherein the indication to transition from the desktop experience mode to the touch experience mode includes a mode change trigger caused by a disconnection of a hardware input device from the computing device.

Example 4

The computer-implemented method as described in one or more of examples 1-3, wherein the indication to transition from the desktop experience mode to the touch experience mode includes a mode change trigger caused in response to a user selection of a mode control displayed on the computing device.

Example 5

The computer-implemented method as described in one or more of examples 1-4, further including presenting a confirmation prompt in response to receiving the indication to transition from the desktop experience mode to the touch experience mode, and wherein said causing the transition from the desktop experience mode to the touch experience mode occur in response to user input to the confirmation prompt confirming the transition.

Example 6

The computer-implemented method as described in one or more of examples 1-5, wherein the application includes a desktop application, and wherein said visually reconfiguring the application user interface includes performing at least one of removing one or more of a title bar or a navigation control from the application user interface, or adding a back button to the application user interface.

Example 7

The computer-implemented method as described in one or more of examples 1-6, wherein the application user interface occupies less than the entire display screen in the desktop experience mode window state, and wherein said applying the window state mapping includes causing the window for the application user interface to be maximized in the display screen in the touch experience mode window state.

Example 8

The computer-implemented method as described in one or more of examples 1-7, wherein the window for the application user interface partially occludes a window for a different application user interface in the desktop experience mode window state, and wherein said applying the window state mapping includes causing the window for the application user interface to be maximized to wholly occlude the window for the different application user interface in the touch experience mode window state.

Example 9

The computer-implemented method as described in one or more of examples 1-8, wherein the application includes a desktop application configured for the desktop experience mode.

Example 10

The computer-implemented method as described in one or more of examples 1-9, wherein the user interaction context includes a context in which content is displayed in the application user interface.

Example 11

The computer-implemented method as described in one or more of examples 1-10, further including: receiving a user movement of the window for the application user interface in the touch experience mode and while a dialogue box for the application is displayed in a foreground of the application user interface; and causing the dialogue box to move along with the window for the application user interface during the user movement of the application user interface.

Example 12

The computer-implemented method as described in one or more of examples 1-11, further including: causing a status bar to be displayed in the display screen while in the touch experience mode, the status bar including one or more system status indicators for the computing device; and responsive to a user interaction with the status bar, causing a status bar extension to be displayed that includes one or more of a visual indicator of an application that is active on the computing device, or a visual indicator that is selectable to launch an application on the computing device.

Example 13

A computer-implemented method including: receiving an indication to transition from a touch experience mode to a desktop experience mode while an application user interface for an application is displayed on a display screen of a computing device and according to a particular user interaction context of the application user interface; causing the transition from the touch experience mode to the desktop experience mode, including visually reconfiguring the application user interface by performing one or more of adding one or more user interface elements to the application user interface or removing one or more user interface elements from the application user interface, while maintaining the user interaction context for the application user interface; and applying a window state mapping to visually reconfigure a window for the application window from a touch experience mode window state to a desktop experience mode window state.

Example 14

The computer-implemented method as described in example 13, wherein the indication to transition from the touch experience mode to the desktop experience mode includes a mode change trigger caused by a connection of a hardware input device to the computing device.

Example 15

The computer-implemented method as described in one or more of examples 13 or 14, wherein the indication to transition from the touch experience mode to the desktop experience mode includes a mode change trigger caused by a mode change signal from a hardware input device.

Example 16

The computer-implemented method as described in one or more of examples 13-15, wherein said visually reconfiguring the application user interface includes adding one or more of a title bar or a navigation control from to the application user interface.

Example 17

The computer-implemented method as described in one or more of examples 13-16, wherein the user interaction context includes content that is displayed in the application user interface.

Example 18

The computer-implemented method as described in one or more of examples 13-17, wherein the window for the application user interface is maximized in the display screen in the touch experience mode window state, and wherein said applying the window state mapping includes causing the window for the application user interface to occupy less than the entire display screen in the desktop experience mode window state.

Example 19

A system including: one or more processors; and one or more computer-readable media storing processor-executable instructions that, responsive to execution by the one or more processors, enable the system to be switchable between a desktop experience mode and a touch experience mode, the processor-executable instructions being executable to perform operations including: maintaining window state mappings that map different desktop experience mode window states to corresponding touch experience mode window states; detecting a mode change trigger to transition from a first experience mode to a second experience mode while an application user interface for an application is displayed according to an interaction context, the first experience mode corresponding to one of the desktop experience mode or the touch experience mode, and the second experience mode corresponding to a different one of the desktop experience mode or the touch experience mode; and initiating a mode change action in response to detecting the mode change trigger, the mode change action including: adding or removing a user interface element from the application user interface dependent upon whether the second experience mode is the desktop experience mode or the touch experience mode; and applying a window state mapping selected from the window state mappings to visually reconfigure a window for the application user interface and while maintaining the interaction context of the application user interface.

Example 20

The system as described in example 19, wherein the window state mapping specifies a different window size for the window of the application user interface in the touch experience mode than in the desktop experience mode.

Conclusion

Although embodiments of techniques and apparatuses enabling configuring a user interface based on an experience mode transition have been described in language specific to features and/or methods, it is to be understood that the subject of the appended claims is not necessarily limited to the specific features or methods described. Rather, the specific features and methods are disclosed as example implementations enabling configuring a user interface based on an experience mode transition.

What is claimed is:

1. A computer-implemented method comprising:
receiving an indication to transition a computing device from a desktop experience mode to a touch experience mode while an application user interface is displayed in an application window on a display screen of a computing device and according to a particular user interaction context of the application user interface, the indication to transition from the desktop experience mode to the touch experience mode including a mode change trigger that occurs in response to detecting a rotation of a hardware input device against a rear surface of the computing device, the hardware input device:
including one or more of a keyboard or a trackpad;
enabling user input separately from the display screen; and
being attachable to and detachable from the computing device;
causing the transition from the desktop experience mode to the touch experience mode, including visually reconfiguring the application user interface by performing one or more of removing one or more user interface elements from the application user interface or adding one or more user interface elements to the application user interface while maintaining the user interaction context of the application user interface; and
applying a window state mapping to visually reconfigure a window for the application user interface from a desktop experience mode window state to a touch experience mode window state.

2. The computer-implemented method as described in claim 1, further comprising presenting a confirmation prompt in response to receiving the indication to transition from the desktop experience mode to the touch experience mode, and wherein said causing the transition from the desktop experience mode to the touch experience mode occurs in response to a user input to the confirmation prompt confirming the transition.

3. The computer-implemented method as described in claim 1, wherein the application comprises a desktop application, and wherein said visually reconfiguring the application user interface comprises performing at least one of removing one or more of a title bar or a navigation control from the application user interface, or adding a back button to the application user interface.

4. The computer-implemented method as described in claim 1, wherein the application user interface occupies less than the entire display screen in the desktop experience mode window state, and wherein said applying the window state mapping comprises causing the window for the application user interface to be maximized in the display screen in the touch experience mode window state.

5. The computer-implemented method as described in claim 1, wherein the window for the application user interface partially occludes a window for a different application user interface in the desktop experience mode window state, and wherein said applying the window state mapping comprises causing the window for the application user interface to be maximized to wholly occlude the window for the different application user interface in the touch experience mode window state.

6. The computer-implemented method as described in claim 1, wherein the application comprises a desktop application configured for the desktop experience mode.

7. The computer-implemented method as described in claim 1, wherein the user interaction context comprises a context in which content is displayed in the application user interface.

8. The computer-implemented method as described in claim 1, further comprising:
receiving a user movement of the window for the application user interface in the touch experience mode and while a dialogue box for the application is displayed in a foreground of the application user interface; and
causing the dialogue box to move along with the window for the application user interface during the user movement of the window for the application user interface.

9. The computer-implemented method as described in claim 1, further comprising:
causing a status bar to be displayed in the display screen while in the touch experience mode, the status bar including one or more system status indicators for the computing device; and
responsive to a user interaction with the status bar, causing a status bar extension to be displayed that includes one or more of a visual indicator of an application that is active on the computing device, or a visual indicator that is selectable to launch an application on the computing device.

10. The computer-implemented method as described in claim 1, wherein the hardware input device is rotatably attached to the computing device.

11. The computer implemented method as described in claim 1, wherein said detecting comprises detecting a repositioning of the hardware input device against the rear surface of the display.

12. The computer-implemented method as described in claim 1, wherein the window for the application user interface partially occupies a separate portion of the display screen from a window for a different application user interface without occluding the window for the different application user interface in the desktop experience mode window state, and wherein said applying the window state mapping further comprises:
causing the window for the application user interface to be adjacent to the window for the different application user interface without occluding the window for the different application user interface in the touch experience mode window state; and
causing a divider that enables various functionalities to be displayed between the window for the application user interaction and the window for the different application user interface.

13. A system comprising:
a computing device including a front surface with a display, and a rear surface opposite the display;
a hardware input device connected to the computing device, the hardware input device including one or more of a keyboard or a trackpad;
one or more processors; and one or more computer-readable media storing processor-executable instructions that, responsive to execution by the one or more processors, cause the system to perform operations including:
    detecting a mode change trigger that occurs in response to a rotation of the hardware input device against the rear surface of the computing device;
    transitioning, based on the mode change trigger, from a first experience mode to a second experience mode, the first experience mode corresponding to one of a desktop experience mode or a touch experience mode, and the second experience mode corresponding to a different one of the desktop experience mode or the touch experience mode; and
    initiating a mode change action in response to detecting the mode change trigger, the mode change action including one of adding or removing a user interface element from an application user interface dependent upon whether the second experience mode is the desktop experience mode or the touch experience mode.

14. The system as described in claim 13, wherein the operations further include applying a window state mapping selected from the window state mappings to visually reconfigure a window for the application user interface and while maintaining the interaction context of the application user interface, and wherein the window state mapping specifies a different window size for the window of the application user interface in the touch experience mode than in the desktop experience mode.

15. The system as described in claim 13, wherein the indication to transition from the first experience mode to the second experience mode including a mode change trigger caused by a mode change signal from the hardware input device.

16. A system comprising:
one or more processors; and
one or more computer-readable storage media storing executable instructions that are executable by the one or more processors to perform operations including:
    receiving an indication to transition from a touch experience mode to a desktop experience mode while an application user interface for an application is displayed on a display screen of a computing device, the indication to transition from the touch experience mode to the desktop experience mode including a mode change trigger that occurs based on a rotation of a hardware input device from a rear surface of the computing device toward the display screen;
    causing the transition from the touch experience mode to the desktop experience mode, including visually reconfiguring the application user interface by performing one or more of adding one or more user interface elements to the application user interface or removing one or more user interface elements from the application user interface; and
    applying a window state mapping to visually reconfigure a window for the application window from a touch experience mode window state to a desktop experience mode window state.

17. The system as described in claim 16, wherein the indication to transition from the touch experience mode to the desktop experience mode comprises a mode change trigger caused by a mode change signal from the hardware input device.

18. The system as described in claim 16, wherein said visually reconfiguring the application user interface comprises adding one or more of a title bar or a navigation control to the application user interface.

19. The system as described in claim 16, wherein the transition from the touch experience mode to the desktop experience mode occurs while maintaining a user interaction context for the application, and wherein the user interaction context comprises content that is displayed in the application user interface.

20. The system as described in claim 16, wherein the window for the application user interface is maximized in the display screen in the touch experience mode window state, and wherein said applying the window state mapping comprises causing the window for the application user interface to occupy less than the entire display screen in the desktop experience mode window state.

* * * * *